United States Patent
Pepper

(10) Patent No.: US 12,454,453 B2
(45) Date of Patent: Oct. 28, 2025

(54) WAVEFRONT REVERSAL DEVICE USING A MEMS SPATIAL PHASE MODULATOR INTEGRATED WITH A RETROREFLECTOR ARRAY

(71) Applicant: David M Pepper, Camarillo, CA (US)

(72) Inventor: David M Pepper, Camarillo, CA (US)

( * ) Notice: Subject to any disclaimer, the term of this patent is extended or adjusted under 35 U.S.C. 154(b) by 929 days.

(21) Appl. No.: 17/643,348

(22) Filed: Dec. 8, 2021

(65) Prior Publication Data

US 2023/0174368 A1   Jun. 8, 2023

(51) Int. Cl.
  *G02B 26/08*   (2006.01)
  *B81B 3/00*    (2006.01)

(52) U.S. Cl.
  CPC ........ *B81B 3/0018* (2013.01); *G02B 26/0833* (2013.01); *B81B 2201/042* (2013.01)

(58) Field of Classification Search
  CPC ............ B81B 3/0018; B81B 2201/042; G02B 26/0833; G02B 26/06
  See application file for complete search history.

(56) References Cited

U.S. PATENT DOCUMENTS

| | | | |
|---|---|---|---|
| 6,154,299 A | 11/2000 | Gilbreath et al. | |
| 7,729,030 B2 | 6/2010 | Pepper et al. | |
| 8,379,286 B2 | 2/2013 | Klotzkin et al. | |
| 2010/0231998 A1* | 9/2010 | Curtis .................. | G11B 7/0065 359/22 |

OTHER PUBLICATIONS

Peck, "Polarization properties of corner reflectors and cavities," JOSA vol. 52, pp. 253-257, 1962.
Snyder, "Paraxial analysis of a cat's eye retroreflector," Appl. Opt. vol. 14, pp. 1825-1828, 1975.
Barrett, "Retroreflective arrays as approximate phase conjugators," Opt. Lett. vol. 4, pp. 190-192, 1979.
Sato, "Corner cube array COAT," Cleo Conference, Talk #FH4, 1981.
O'Meara, "Wavefront compensation with pseudoconjugation," Opt. Eng. vol. 21, pp. 271-280, 1982.
Jacobs, "Experiments with retrodirective arrays," Opt. Eng. vol. 21, pp. 281-283, 1982.
Sato, "Corner cube array COAT," Opt. Eng. vol. 21, pp. 1178-1184, 1982.
Biermann, "Design and analysis of a diffraction-limited cat's eye retro reflector," Opt. Eng. vol. 41, pp. 1655-1660, 2002.

(Continued)

*Primary Examiner* — Euncha P Cherry

(57) ABSTRACT

Wavefront reversal device using a MEMS spatial phase modulator integrated with a retroreflector array. A cat's eye retro reflector array is integrated with a phase only MEMS spatial light modulator (SLM) so that each cat's eye retroreflector in the array is integrated into each pixel of the MEMS SLM. The composite MEMS device provides continuous analog phase modulation and retro-reflection for each pixel. By integrating a cat's retro-reflector onto each pixel, the combination provides both phase-shifting control and tilt compensation of piecewise optical beams, on a pixel-by-pixel basis. The resultant device emulates a deformable mirror with an integrated cat's eye retro array, the combination of which is equivalent to a true wave front reversal device.

17 Claims, 18 Drawing Sheets

(56) References Cited

OTHER PUBLICATIONS

Lu, "Planar high-numberical aperture low-loss focussing reflectors and lenses using subwavelength high contrast gratings," Opt. Express vol. 18.
Gavel, "Woofer-tweeter deformable mirror control for closed-loop adaptive optics: Theory and practice," arXiv:1407.8208v1 [astro-ph. IM]Jul. 30, 2014.
Arbabi, "Planar metasurface retro reflector," Nature Photonics Lett. vol. 11, pp. 415-421, 2017.
Gorkom, "Characterization of deformable mirrors for the MagAO-X project," arXiv:1807.04370v1 [astro-ph.IM]Jul. 11, 2018.
Wei, "A high aspect ratio inverse designed holey metalens," https://doi.org/10.1021/acs.nanolett.1c02612.

* cited by examiner

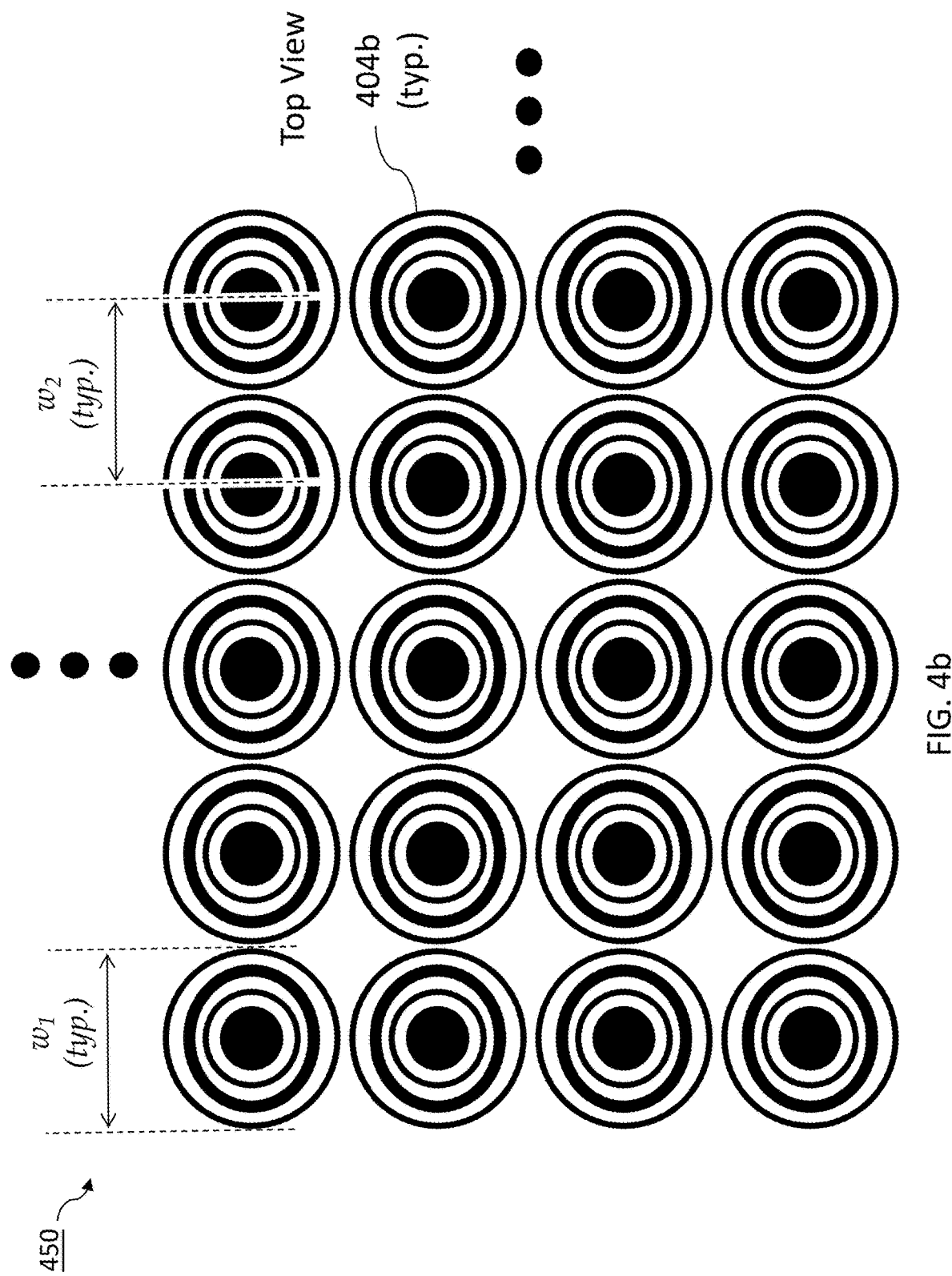

WAVEFRONT REVERSAL DEVICE USING A MEMS SPATIAL PHASE MODULATOR INTEGRATED WITH A RETROREFLECTOR ARRAY

FIELD OF THE INVENTION

The present invention relates to adaptive optics, wave front reversal, phase conjugation and pseudo-conjugation, and, more specifically, to MEMS-based spatial light modulators integrated with a cat's-eye retro-reflector array, with near-ideal wave front reversal properties over a wide field-of-view.

DESCRIPTION OF RELATED ART

The related art pertains to adaptive optical devices, microelectromechanical systems (MEMS), spatial light modulators (SLMs), and, more specifically, to MEMS spatial phase modulators. The related art also pertains to retroreflectors, modulating retroreflectors, retroreflector arrays and approximate phase conjugators (pseudo-conjugators). This art may be of interest to the reader when reviewing this description of the present technology.

MEMS spatial light modulator devices, and more specifically, MEMS spatial phase modulators, have revolutionized the fields of adaptive optics, laser beam control, pulse shaping, spectroscopy, optical computing and real-time holographic applications, to name a few. The SLMs are designed to provide for optical phase shifting of each resolvable pixel of a given image, typically a wave front of an optical beam. These devices operate at speeds of kHz to MHz, with a phase shift of greater than an optical wavelength per pixel, and with array sizes ranging from 10s of pixels to greater than 1,000 pixels in each dimension.

In many adaptive optical applications, the optical beam may possess relatively large tilt errors in addition to wave front phase errors. In the case of a global tilt error, a fast-steering mirror can be utilized to correct for such an overall error.

However, in situations where a given wave front possesses piecewise local tilt errors in addition to global errors, a MEMS device with each pixel providing relatively large local tilt error compensation is required, in addition to phase control of each pixel and global tilt errors.

In myriad adaptive optical applications, two or three deformable mirrors (DMs) or SLMs are required. In this case, one DM (or SLM), the "tweeter," possesses many actuators (e.g., 2040), provides a relatively small stroke (3.5 µm), addresses high-spatial-frequency aberrations and small tilt errors; and, a second DM (or SLM), the "woofer," possesses fewer actuators (e.g., 97), provides a relatively large stroke (e.g., 30 µm), addresses low-spatial-frequency aberrations and large tilt errors.

The present invention can significantly relax these stringent device requirements, owing to the large FOV envisioned, and large (passive) tilt error compensation, all on a pixel-by-pixel basis, without compromising the maximum phase-shifting stroke of the SLMs or DMs.

Commercial MEMS devices are available that provide for phase shifting and tilt control of each pixel of the device. In the case of a 1,000×1,000 optical element SLM, a 3×(1000× 1000) array of pixels is required for phase and 2-d tilt control: this added degree of freedom (i.e., 2-d tilt control) requires 2,000,000 additional tilt controls (1,000 along each transverse dimension), in addition to the 1,000×1,000 controls for the phase shifting elements. The prior art therefore requires a factor of 2 additional closed-loop control channels to drive such devices. Hence, a million-pixel optical device requirement effectively demands a three-million-pixel control device when tilt error compensation is incorporated into the SLM.

Moreover, the present commercial devices are limited in parameter space, in that there is a tradeoff between the piston stroke, or optical phase-shifting correction range (e.g., 3.5 µm stroke) and the tilt-correction range, or the field-of-view (e.g., 8 mrad) capabilities.

It is therefore a need to realize a MEMS spatial phase controlling device that provides phase shifting and tilt control without the necessity for an additional 2,000×2,000 control parameters (in this example), and, furthermore, without the phase-shifting/FOV tradeoff constraint. This invention addresses this limitation.

The prior art also describes a proof-of-principle deformable mirror integrated with an array of four corner-cube reflectors to enable near-ideal, true wave front reversible of an incident beam. However, this proof-of-concept demonstration requires physically attaching a bulk corner-cube reflector onto each deformable pixel of a bulk deformable mirror. Moreover, this proof-of-concept demonstration involves an independent corner cube mated with an independent deformable mirror. In the present invention, these two functionalities are integrated into one another; they are not independent devices.

Such a design philosophy would not be possible with present-day MEMS devices, owing to the fact that the mass of a typical corner-cube would add a significant mass loading to each MEMS element, rendering the device useless. Moreover, to physically attach a 1000×1000 corner cubes onto 1000×1000 MEMS elements is intractable and impractical. It is therefore a need to realize a retro-reflector for each MEMS pixel element that minimizes additional mass loading and can be realized on a practical, massive scale (e.g., 1000×1000 pixels). The present invention provides a solution to this limitation.

Another limitation is that the prior art does not include a cat's-eye, phase-only, retro-modulator, much less one integrated with a multi-element, high-definition, piston-activated, phased array.

Moreover, the prior art teaches a binary, intensity, stand-alone (single) retro modulator, which is fundamentally different and not anticipated by the present invention. The present invention provides a solution to this limitation: (1) continuous phase-shifting, (2) retro phase modulation, (3) large FOV and (4) a large number of elements.

Yet another limitation of the prior art is that corner-cube retro reflectors can modify the polarization state of the retro directed light, dependent on the materials and the configuration used in the fabrication of the device, which is undesirable. Depolarization introduces loss in most systems that depend on preserving the polarization of the light through the system to maximize the system photon efficiency. The present invention overcomes this limitation, as cat's eye retro reflectors essentially preserve the polarization state of an incident beam upon retro-reflection.

The prior art also includes single (stand-alone) cat's eye retro-modulators limited to intensity modulation capability. This prior art involves a binary class of modulator, namely, the retro-reflector either retro-directs an incident beam or switches off the retro-directive functionality.

The prior art includes a stand-alone (single) cat's eye retro-modulator, integrated with an electrically switchable multiple quantum well (MQW) semiconductor absorber to either transmit or absorb an incident optical beam; a binary intensity retro-modulation capability. Hence, these approaches result in an on-off characteristic leading to a binary, intensity modulated return beam. Thus, the prior art teaches against the present invention since it involves absorption modulation as well as binary intensity modulation.

By contrast, the present invention teaches (1) a continuous modulation capability; (2) continuous phase modulation—as opposed to a binary, intensity modulation characteristic inherent in the prior art; (3) tilt compensation over a wide FOV; and (4) extends this capability to a multi-pixel array. The present invention teaches an integrated retro-reflector phase-modulator, in a planar, compact and light-weight device, scalable from 10 to 1000 pixels in each dimension. The known art does not teach or anticipate this combined capability and scalability.

Another class of a stand-alone, single, binary intensity retro-modular device in the prior art utilizes MEMS moveable components to intensity-modulate an optical beam. The moving parts—typically a tilt mirror or a grating or a Fabry-Perot cavity—impart binary, digital intensity modulated information onto an optical beam. Similar to the MQW device, the retro-reflector either retro-directs an incident beam or switches off the retro-directive capability entirely, limited to less than a wave of optical phase shift to function. Moreover, the prior art teaches a stand-alone (i.e., a single) device, not an array. Thus, the prior art teaches against that of the present invention. The present invention provides a solution to this limitation, viz., continuous phase shifting of an optical beam—over multiple waves of phase shift—upon retro reflection without loss, i.e., no intensity modulation.

The prior art also teaches optical interference approaches to realize intensity modulation (again, utilizing a stand-alone device), including moveable Fabry-Perot cavity elements or gratings that can be either "activated" or "deactivated," resulting in a binary intensity modulated return beam. What is needed is a retro-directive device that imparts phase modulation (as opposed to intensity modulation), with continuous, analog phase modulation capability (as opposed to a digital binary on/off modulation format), over a large number of independent pixels.

The present invention provides a solution to this limitation, by providing for continuous phase modulation of the retro-reflected beam, and tilt compensation thereof, over a wide field of view (FOV), over a large array.

In prior art devices that possess electro-optic (EO) modulators, direct electrical connections are required to provide for the necessary electric fields to realize a given phase shift. This class of EO device is not practical for the present invention since the piston-driven SLM phase shifter cannot practically accommodate electrical connections. Such an approach would render the SLM useless due to additional mass load of EO materials and the mechanical constraints that prohibit direct electrical connections to the MEMS actuators. The present invention provides a solution to these limitations.

The prior art describes a single, stand-alone large-aperture, cat's eye retro-reflector with a bulk set of optical elements (e.g., relatively large glass optics) to realize diffraction-limited performance over a wide FOV, again via intensity modulation of an optical beam. The devices are designed with a large aperture for efficient optical communication systems. Such arrangements are not practical for miniature, low-mass pixelated devices, and, moreover, not amenable to large arrays of devices. This invention overcomes this limitation.

The prior art describes spatial phase modulators with a piston-like motion of the MEMS pixels, with application to adaptive optics, laser beam control, spectroscopy among other applications. However, using only piston corrective motion does not result in a true wave front reversed replica that is ideally inverted (or "time reversed"); tilt compensation is also required for each independent pixel.

It is well known that the combination of phase shifting and tilt compensation of an optical beam is required to generate a true wavefront-revered replica of an incident beam. The present invention overcomes this limitation, resulting in the generation of a wavefront-reversed replica with near-ideal "time-reversed" propagation properties, through the use of both piston (phase) motion, as well as tilt compensation of a piecewise optical beam, integrated into a single device, over a large FOV.

The prior art does describe a MEMS device with limited piston and tilt control of each pixel in the array. However, that device requires 3×N control actuators to service only N optical pixels, thereby increasing the complexity of the system feedback network by a factor of three and reducing the number of potential optical actuators by this factor. In addition, the response time of the device is limited by the time required to tilt each pixel over azimuth and elevation angles. The present invention involves a passive tilt compensation approach which does not require additional movable parts and, which services both azimuth and elevation in a single device. Moreover, the present invention provides tilt compensation via retro reflection that passively responds at the speed of light through the device, not limited to the active electrostatic tilting of movable pixels.

In addition, this prior art device has geometrical limitations as to the maximum degree of tilt compensation for a given maximum piston stroke and pixel pitch dimension (8 mrad of maximum tilt correction; and, 3.5 µm maximum piston stroke in one case). However, these two parameters cannot be realized at the same time. That is, the maximum tilt feature comes at the expense of the maximum phase stroke of the SLM pixel, and, vice versa. Thus, a tilt/phase compensation tradeoff exists in general. The present invention overcomes this tradeoff.

The present invention also provides for a tilt compensation range that is an order of magnitude greater than the present device, and, moreover, independent of the phase modulation characteristic of the device and vice versa. That is, the present invention does not impose a tilt/phase compensation tradeoff constraint of the device, as is the case of the known art. In addition, the present invention increases the FOV by over an order of magnitude factor in each polar direction (relative to the prior art), without compromising the maximum piston stroke, while maximizing the number of available optical actuator pixels. Hence an N-pixel SLM devotes all N pixels to provide phase modulation and retro reflection, as opposed to only N/3 pixels.

Note also, that the speed of the tilt correction in the prior art is similar to the speed of the phase correction. What is needed is a device that does not require a factor of three additional degrees of freedom to achieve phase as well as tilt compensation of an optical beam. What is also needed is a tilt compensation capability that depends on the optical system design and not limited by geometric considerations. Finally, what is needed is a tilt compensation bandwidth that is only limited by the speed of light through the device and not by the response of electrically controlled actuators. The present invention overcomes these limitations.

The prior art also includes a single, stand-alone planar, passive retroreflector. Moreover, it is a solid, monolithic structure. This device is passive and has no provisions for modulation, especially for phase modulation, which is not anticipated. In addition, the extension to arrays of independent phase-only retro modulators on a pixel-by-pixel basis is not anticipated or obvious.

The prior art also includes passive (i.e., without teaching modulation) arrays of flexible retroreflectors, typically used for road signs and for emergency personnel nighttime clothing. These flexible arrays are also known as "pseudo-conjugators" (i.e., approximate phase conjugators) in the art. These arrays can partially compensate for optical distortions and, hence, do not give rise to a "true" wavefront-reversed replica of an incident optical beam. They only compensate for phase errors that are odd in symmetry: A global tilt error is an example of first-order odd term in phase error. However, these arrays do not compensate for phase errors that are even in symmetry: A focus error is an example of a first-order even term in phase error. Moreover, these arrays do not modulate the phase of an incident beam. The present invention overcomes these limitations. The present invention compensates for both odd and even terms in phase error and, moreover, phase-modulates and retro-reflects an incident optical beam on a pixel-by-pixel basis. Hence, the present invention gives rise to a true wavefront-reversed replica of an incident optical beam.

The aforementioned state-of-the-art in retro-reflective and retro-modulation devices includes, for example, (i) U.S. Pat. No. 6,154,299, entitled "Modulating retro reflector using multiple quantum well technology," (ii) U.S. Pat. No. 7,729, 030, entitled "Optical retro-reflective apparatus with modulation capability," (iii) U.S. Pat. No. 8,379,286, entitled "Integrated angle of arrival sensing and duplex communication with cats-eye multiple quantum well modulating retro reflector," (iv) E. R. Peck, "Polarization properties of corner reflectors and cavities," JOSA 52, pp. 253-257 (1962), (v) J. J. Snyder, "Paraxial ray analysis of a cat's eye retroreflector," Appl. Opt. 14, pp. 1825-1828 (1975), (vi) H. H. Barrett, et al., "Retroreflective arrays as approximate phase conjugators," Opt. Lett. 4, pp. 190-192 (1979), (vii) T. Sato, et al., "Corner cube array COAT," CLEO Conference, Talk #FH4 (1981), (viii) T. R. O'Meara, "Wavefront compensation with pseudoconjugation," Opt. Eng. Vol. 21, pp. 271-280 (1982), (ix) S. F. Jacobs, "Experiments with retrodirective arrays," Opt. Eng. Vol. 21, pp. 281-283 (1982), (x) T. Sato, et al., "Corner cube array COAT," Opt. Eng. Vol. 21, pp. 1178-1784 (1982), (xi) M. L. Biermann, et al., "Design and analysis of a diffraction-limited cat's-eye retro reflector," Opt. Eng. Vol. 41, pp. 1655-1660 (2002), (xii) W. S. Rabinovich, et al., "A cat's eye multiple quantum well modulating retro-reflector," IEEE Photonics Tech. Lett. 15, pp. 461-463 (2003), (xiii) F. Lu, et al., "Planar high-numerical-aperture low-loss focusing reflectors and lenses using subwavelength high contrast gratings," Opt. Express, vol. 18, pp. 12606-12614 (2010), (xiv) D. Gavel, et al., "Woofer-tweeter deformable mirror control for closed-loop adaptive optics: Theory and practice," arXiv:1407.8208v1 [astro-ph.IM] 30 Jul. 2014, (xv) A. Arbabi, et al., "Planar metasurface retro reflector, Nature Photonics Lett., Vol. 11, pp. 415-421 (2017), (xvi) K. V. Gorkom, et al., "Characterization of deformable mirrors for the MagAO-X project," arXiv:1807.04370v1 [astro-ph.IM] 11 Jul. 2018; and (xvii) S. Wei, el al., "A high aspect ratio inverse-designed holey metalens," https://doi.org/10.1021/acs.nanolett.1c02612.

The present invention addresses and overcomes the aforementioned limitations by introducing a phase-only MEMS spatial light modulator (SLM) array, integrated with a specific class of pseudo-conjugator (a cat's eye retroreflective array), on a pixel-by-pixel basis. That is, the present invention involves one cat's-eye retro reflector integrated with each phase-only MEMS SLM pixel—resulting in an array of such compensated pixels, all in a compact, planar, lightweight device. The composite device performs the operation of a true phase-conjugation (true "time reversal") of wavefronts of an incident optical beam.

SUMMARY OF THE INVENTION

It is an attempt in creating the present invention to provide a compact, planar, lightweight, robust spatial light modulator (SLM) that can provide a true wave front reversed replica of light with high-fidelity that also retro reflects the light incident upon the system, with continuous (analog) phase control of an optical beam, on a pixel-by-pixel basis. This combination of capabilities (phase control and retro reflection and phase modulation in an array) provides for a true wavefront reversed ("time reversed") replica of an incident optical beam.

This invention enables automatic tilt control and phase compensation for such propagation errors as beam wander, relative platform motion, piecewise tilt errors due to propagation of optical beams through atmospheric turbulence, underwater distortions, laser amplifier aberrations, imperfect optical elements and modal dispersion in multimode guided wave structures. Applications include laser communication over turbulent paths, laser energy scaling, laser beam pulse formation, medical applications and industrial process control to name a few.

It is a further attempt in creating the present invention to minimize depolarization of light that interacts with the SLM. Depolarization can result in an undesirable insertion loss of light incident on the device, and, hence, reduce the efficiency of an adaptive optical system. Arrays of corner cubes (as well as single corner cubes) can modify the polarization of light upon retroreflection. The present invention overcomes this limitation through the use of cat's eye retro-reflectors on a pixel-by-pixel basis. The use of a cat's-eye retro-reflective array (otherwise referred to as a pseudo-conjugator) essentially preserves the polarization of the retro directed light, thereby optimizing the insertion loss of the system and, enables this invention to service myriad optical systems applications where polarization maintenance is a constraint.

It is yet a further attempt in creating the present invention to realize a SLM with little or no additional mass loading of the MEMS piston drive relative to existing devices, thereby maintaining approximately the same mechanical and dynamic specifications of existing devices. In some embodiments described herein, the net SLM mass load can be actually reduced, thereby increasing the parameter space of the SLM in terms of speed-of-response. The use of nanostructures, micro-diffractive optical elements, metasurface structures and thin film metallization in the embodiments of this invention adds negligible mass to a SLM.

It is a further attempt in creating the present invention to realize a device with a similar aspect ratio and footprint as present state-of-the-art SLMs, now with enhanced performance. The present invention provides for ease of retrofitting the device into existing systems that employ this class of SLM with minimal modification, while enhancing the device capability.

It is a further attempt in creating the present invention to significantly reduce the complexity of existing SLMs that include piston as well as tilt compensation for each pixel, thereby reducing the number of control parameters from 3N to N, for a SLM with N addressable pixels. As an example, the present invention can reduce the number of pixels, as well as the number of pixel controllers and associated computational and drive circuitry, from 3,000,000 to 1,000,000 elements. The use of integrated retro-reflectors in this invention obviates the need for 2N additional controls for tilt error compensation.

It is a further attempt in creating the present invention to provide a SLM with an integrated tilt control that can reduce the stringent demands of SLMs for "woofer-tweeter" deformable mirror systems so that the full range of piston strokes can be utilized for phase-shifting of optical beams and obviate the tradeoff constraint of phase-shifting versus tilt control of the prior art. The present invention overcomes this limitation by providing an optical spatial phase modulator, integrated with passive tilt control, over a large FOV It is a further attempt in creating the present invention to effectively compensate for all odd and even terms in the phase distortion encountered by an optical beam, within the resolution of the device. It has been shown that a retroreflective array (also known as a pseudo-conjugator) can compensate for only odd terms of a given optical phase distortion beyond the linear phase term (i.e., a global tilt error and beyond). However, an isolated retroreflector array does not compensate for even terms of a given phase distortion (e.g., a focus error and beyond). The present invention integrates a phase modulation capability with a piecewise tilt compensation capability, thereby compensating for all even and odd phase terms of a given phase distortion, again limited by the resolution of the device.

It is a further attempt in creating the present invention to reduce the number of pixels from N of the prior art to the square root of N (i.e., $N^{1/2}$), required to achieve the same fidelity of the wave front reversed replica when compared against a piston-only SLM. It has been shown that the combination of a deformable mirror with a corner cube array reduces the number of pixels from N to the square root of N (i.e., $N^{1/2}$) to realize approximately the same conjugation fidelity (i.e., the "goodness" of the wave front reversed replica) relative to a phase-only SLM. As an example, a 1,000×1,000 element array can be reduced to a 30×30 element array, thereby significantly reducing the required number of pixels in the SLM and associated electronic control parameters. Using a bulk deformable mirror with four attached corner cube retros, it has been shown in this proof-of-principle demonstration that the use of an optical phase shifting array integrated with tilt compensation for each pixel can result in this desirable reduction in the complexity of the system.

The present invention addresses and overcomes the aforementioned limitations by introducing a phase-only MEMS spatial light modulator, SLM, array integrated with a cat's eye retroreflective array, on a pixel-by-pixel basis. That is, the present invention involves integrating one cat's-eye retro reflector with each phase-only MEMS SLM pixel, without affecting the array size, the maximum piston stroke (i.e., the maximum optical phase shift), the mechanical properties, the response time or the form factor (i.e., the footprint) of the phase-only SLM. The present results in a compact, planar, lightweight MEMS-based device to achieve this goal.

Note that a conventional (phase-only) deformable mirror (DM) or SLM does not compensate for local tilts and, therefore, does not result in a true wavefront reversal function. Moreover, an array of corner cubes compensates for piecewise tilt errors but does not provide true wavefront reversal. In the present invention, by integrating a phase-only SLM array with a cat's eye tilt compensation array, near perfect wave front reversal is possible in the case of an N×N pixel array, which is a motivation factor that underlies this invention. The present invention can apply to both SLMs as well as to DMs to advantage.

This invention provides a planar structure for continuous phase control and tilt compensation in a compact package through the use of planar, compact nanostructures, microdiffractive elements and metasurface structures that emulate a specific class of pseudo-conjugator (a cat's eye retroreflector array), integrated with a spatial phase modulator array, all in a single robust device.

The embodiments disclosed herein involve structures that are comprised of materials including, but not limited to, fused silica, GaAs, InP, GaN, aluminum oxide and silicon dioxide substrates and films; amorphous silicon and AlGaAs, microgratings, subwavelength high-contrast gratings (HCGs), metasurface and inverted-designed holey metalenses; AlGaAs and amorphous silicon nanoposts; and thin-film metallization and dielectric anti-reflection coatings. All these structures are integrated with spatial phase modulators to achieve continuous phase control and tilt compensation of optical beams on a pixel-by-pixel basis and can be manufactured in high volume using commercially available technology.

The two functionalities described herein are not independent of one another (i.e., the retro reflector and the spatial phase modulator), in that one element of the cat's eye retro-reflector incorporates the moveable element of the spatial phase modulator. That is, this invention does not involve an independent cat's eye retro reflector simply mated with an independent spatial phase modulator. They are part and parcel of each other. This critical and fundamental aspect of the invention in not anticipated or obvious in the prior art.

The present invention addresses and overcomes the aforementioned limitations by introducing a phase-only MEMS spatial light modulator (SLM) array, integrated with a specific class of pseudo-conjugator (cat's eye retroreflective array), on a pixel-by-pixel basis. That is, the present invention involves one cat's-eye retro reflector integrated with each phase-only MEMS SLM pixel—resulting in an array of such compensated pixels, all in a compact, planar, lightweight device. The composite device performs the operation of a true phase-conjugation (true "time reversal") of wavefronts of an incident optical beam.

BRIEF DESCRIPTION OF THE DRAWINGS

The accompanying drawings, which are incorporated into and form a part of the disclosure, are only illustrative embodiments of the invention serve to better understand the principles of the invention in conjunction with this description.

A subwavelength structure that emulates a concave, parabolic reflector is formed on each planar, piston-driven SLM reflective segment.

This combination emulates a compact, planar, phase-only SLM, integrated with a cat's eye retro-array, while preserving the basic SLM dynamic response and form factor. In this figure and the ones to follow, the piston stroke length, focal length, superstructure spacer height and substrate thickness are not drawn to scale.

FIG. 4b depicts a top ("beam's eye") view of the upper N×N array of subwavelength (closed-packed) optical elements, each element of which is in the form of a subwavelength, microdiffractive optics, such as a high-contrast grating, a zone plate or Fresnel optical element.

Such arrays of elements can be formed above or on the surface of a corresponding MEMS array of planar, piston-driven elements. The combination emulates a phase-only SLM, integrated with a pseudo-conjugator (i.e., a cat's eye retro-reflective array).

Figure 5A:
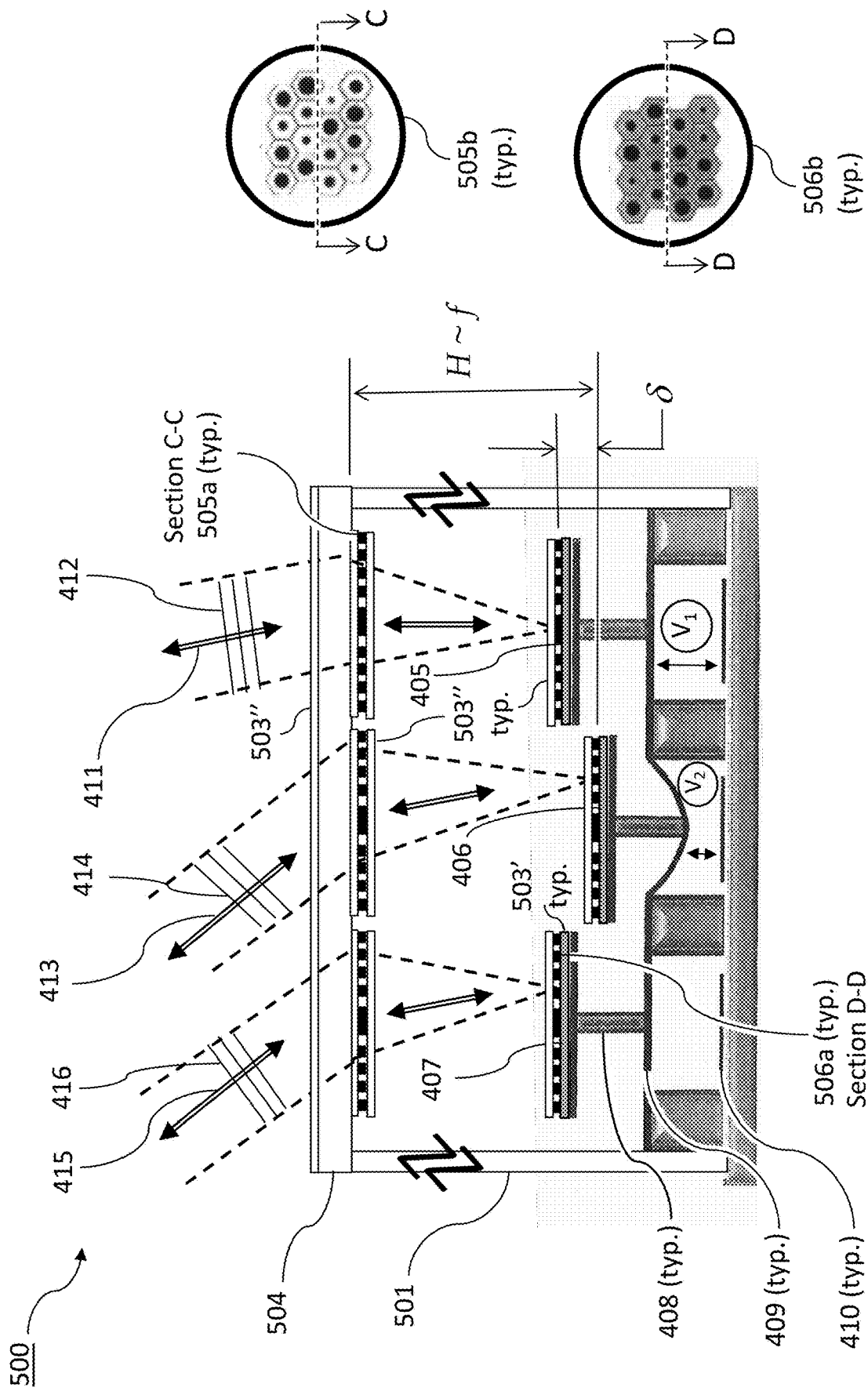

FIG. 5a shows an exemplary embodiment of the present invention depicting an upper array of subwavelength optical elements, placed on a superstructure above the SLM MEMS piston-driven segments. The subwavelength optical elements emulate a microlens array or a metasurface.

This array is integrated with a SLM that employs an array of phase-only segmented, planar, piston-like optical phase shifters. In one case, a subwavelength structure element (e.g., a high-contrast grating, microdiffractive element) is formed on each SLM planar surface segment and emulates a concave, parabolic reflector. In another case, the subwavelength structure is in the form of a nanopost metasurface or an inverse-designed holey metalens. Note that the subwavelength elements on the upper array are fabricated onto a superstructure, registered directly above each respective phase-only SLM array segment.

Note also, that the cross section of the array need not be circular in general. This combination of elements emulates a phase-only SLM, integrated with a cat's eye retro-array, while preserving the basic SLM dynamic response and form factor.

Figure 5B:
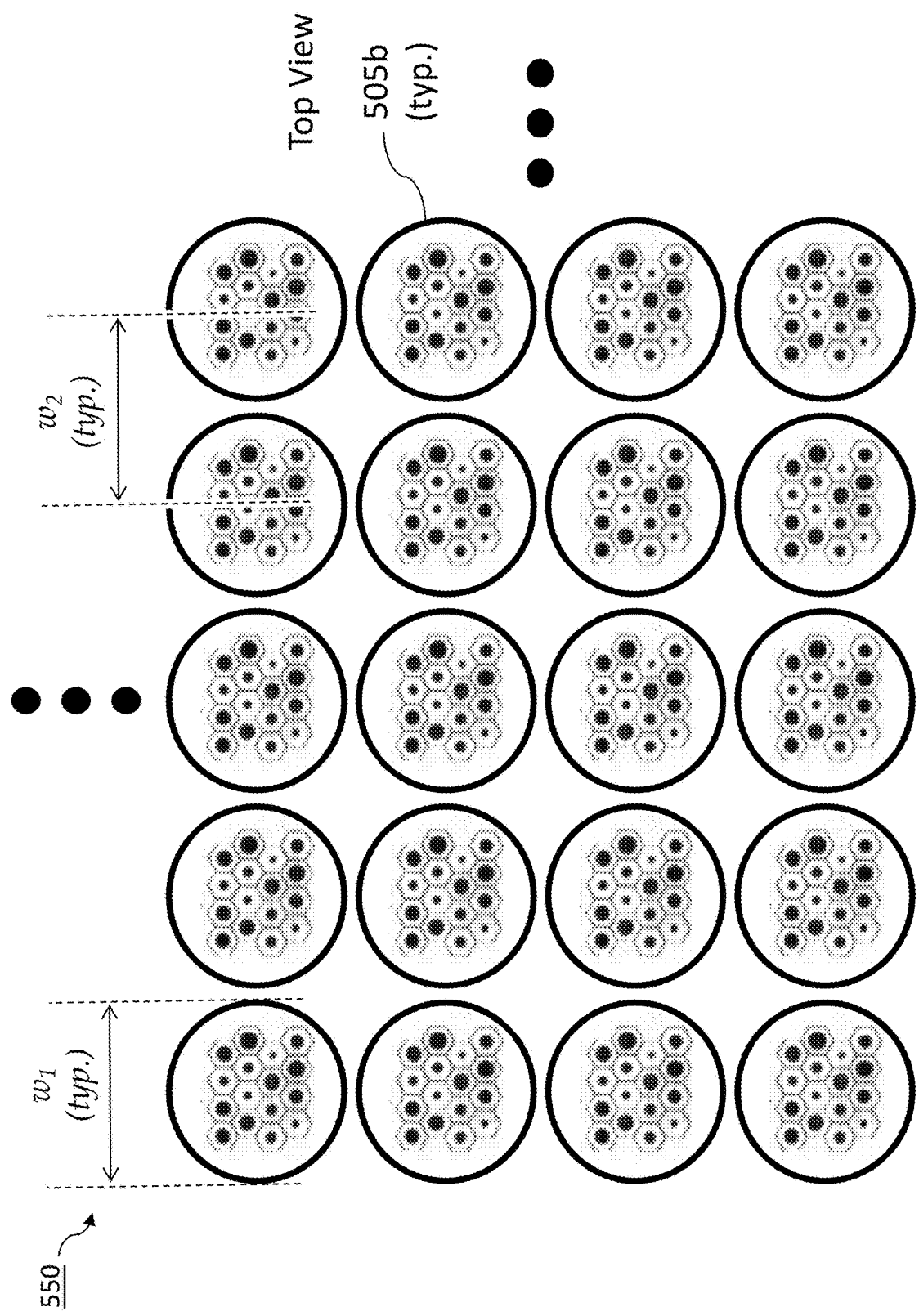

FIG. 5b depicts a top ("beam's eye") view of the upper N×N array of subwavelength (closed-packed) metasurface optical elements, comprised of an array of nanoposts, each element of which is positioned directly above each respective SLM phase-only piston element.

Figure 5C:
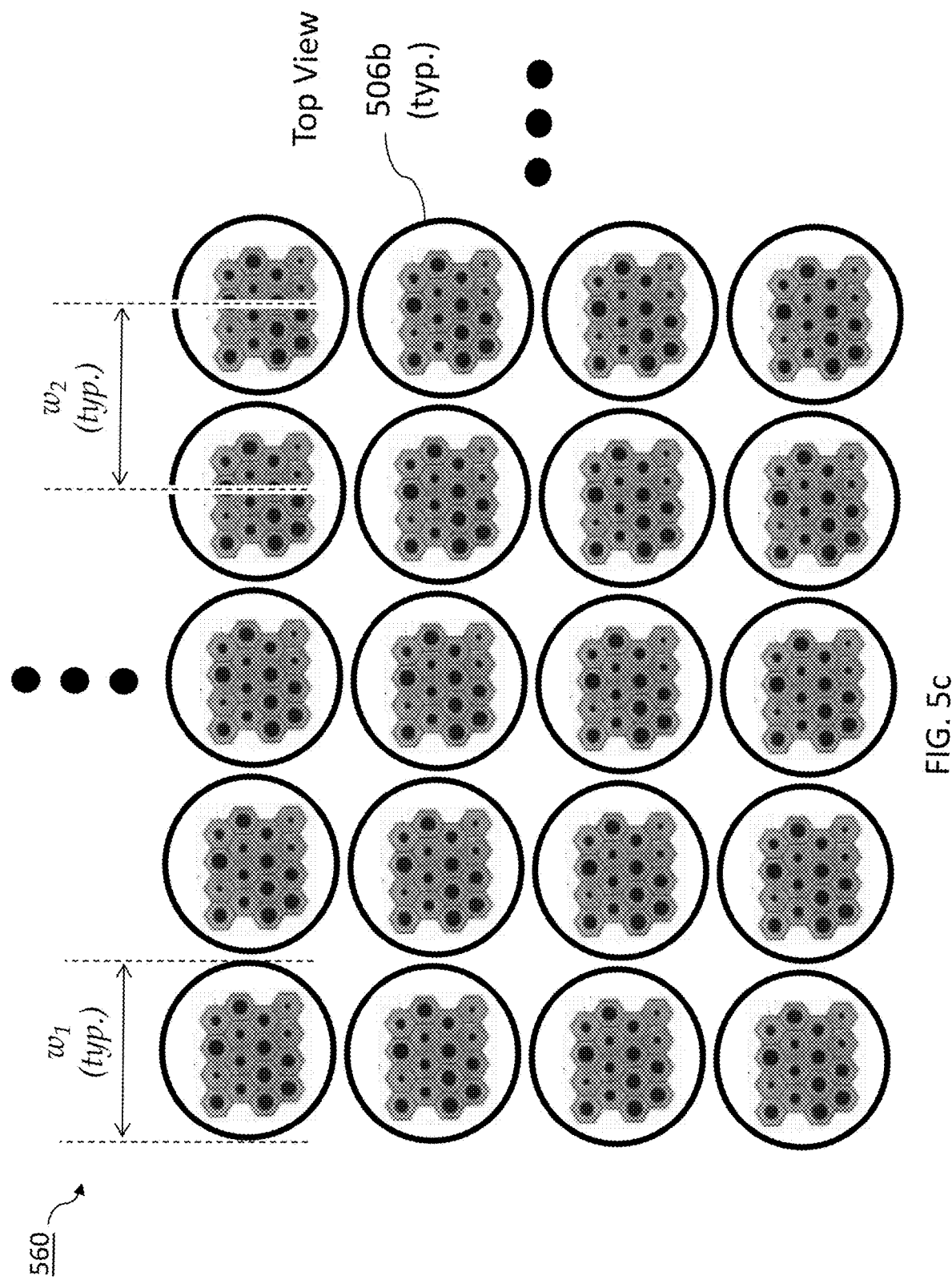

FIG. 5c depicts a top ("beam's eye") view of the lower N×N array of subwavelength (closed-packed) metasurface optical elements, comprised of an array of nanoposts (in this example), each element of which can be formed on a substrate or on the surface of each respective SLM phase-only piston element. The gray background depicts a thin-film gold layer, formed underneath of each lower metasurface element.

Figure 5D:
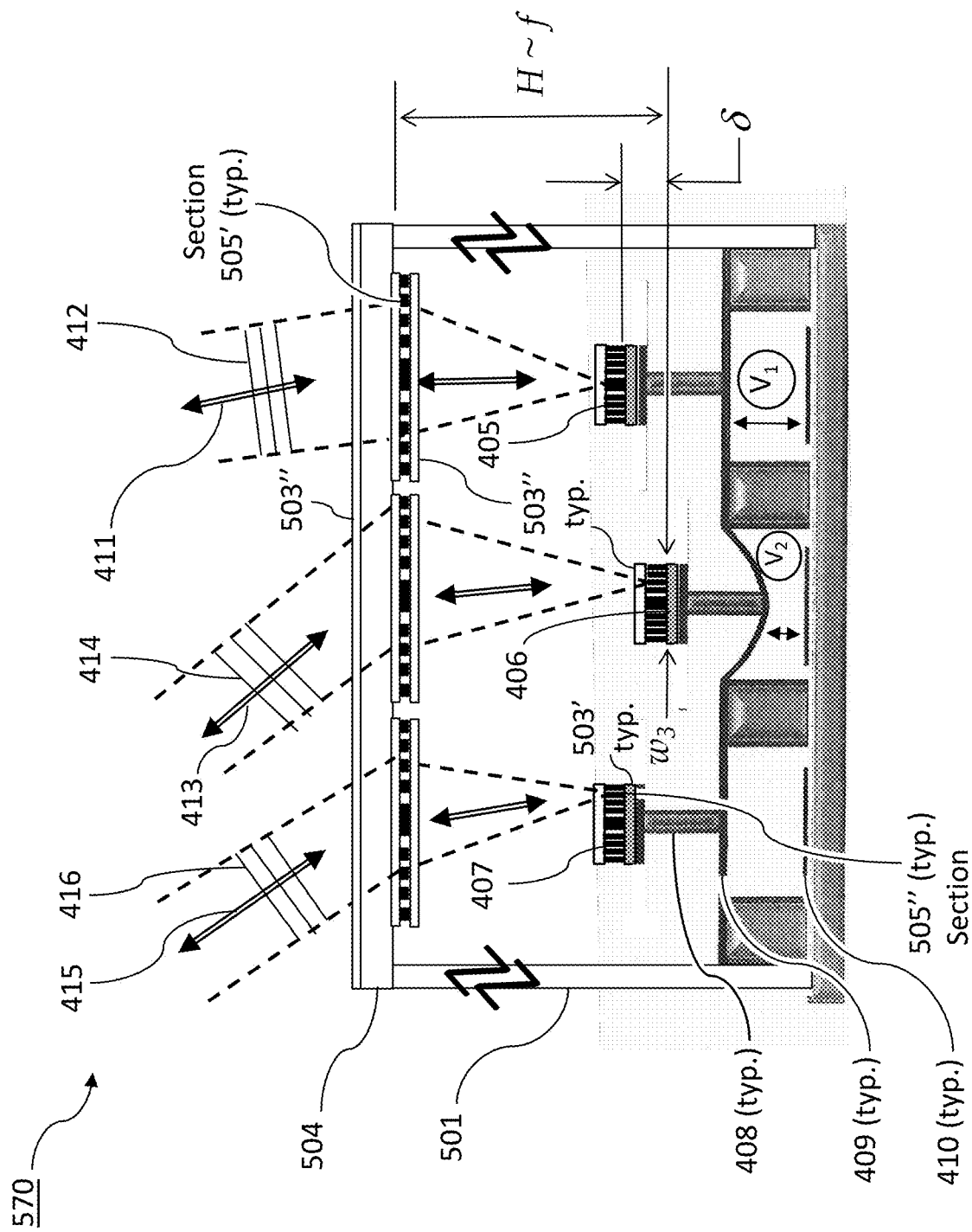

FIG. 5d depicts an exemplary embodiment of the present invention similar to that of FIG. 5a, but, with each SLM planar pixel segment reduced in area, thereby significantly decreasing the mass load of each pixel, while still functioning as a parabolic reflector (or metasurface), without optical loss over a reasonable FOV. Thus, the response time of the device can be enhanced for the same drive control.

Figure 4A:
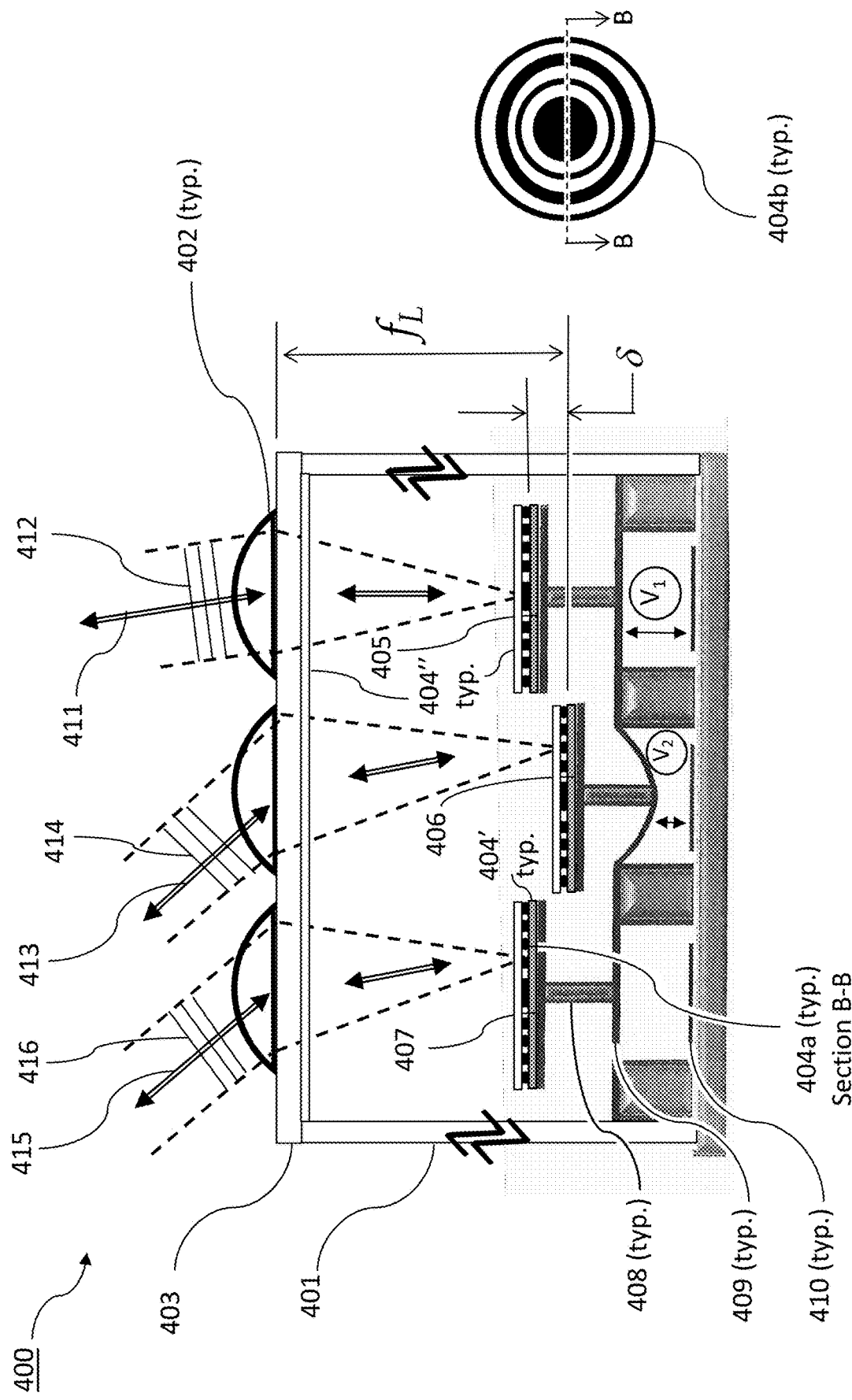
FIG. 4a shows an exemplary embodiment of the present invention depicting a microlens array integrated with a SLM, the latter of which employs an array of phase-only segmented, planar, piston-like optical phase shifters. The microlens array is comprised of an array of microlenses, aspheric lenses, holographically formed microlenses, Fresnel lenses, or zone plates (square or circular). The microlens array is fabricated on a superstructure, with each microlens registered directly above each respective phase-only SLM segment.
Figure 5E:
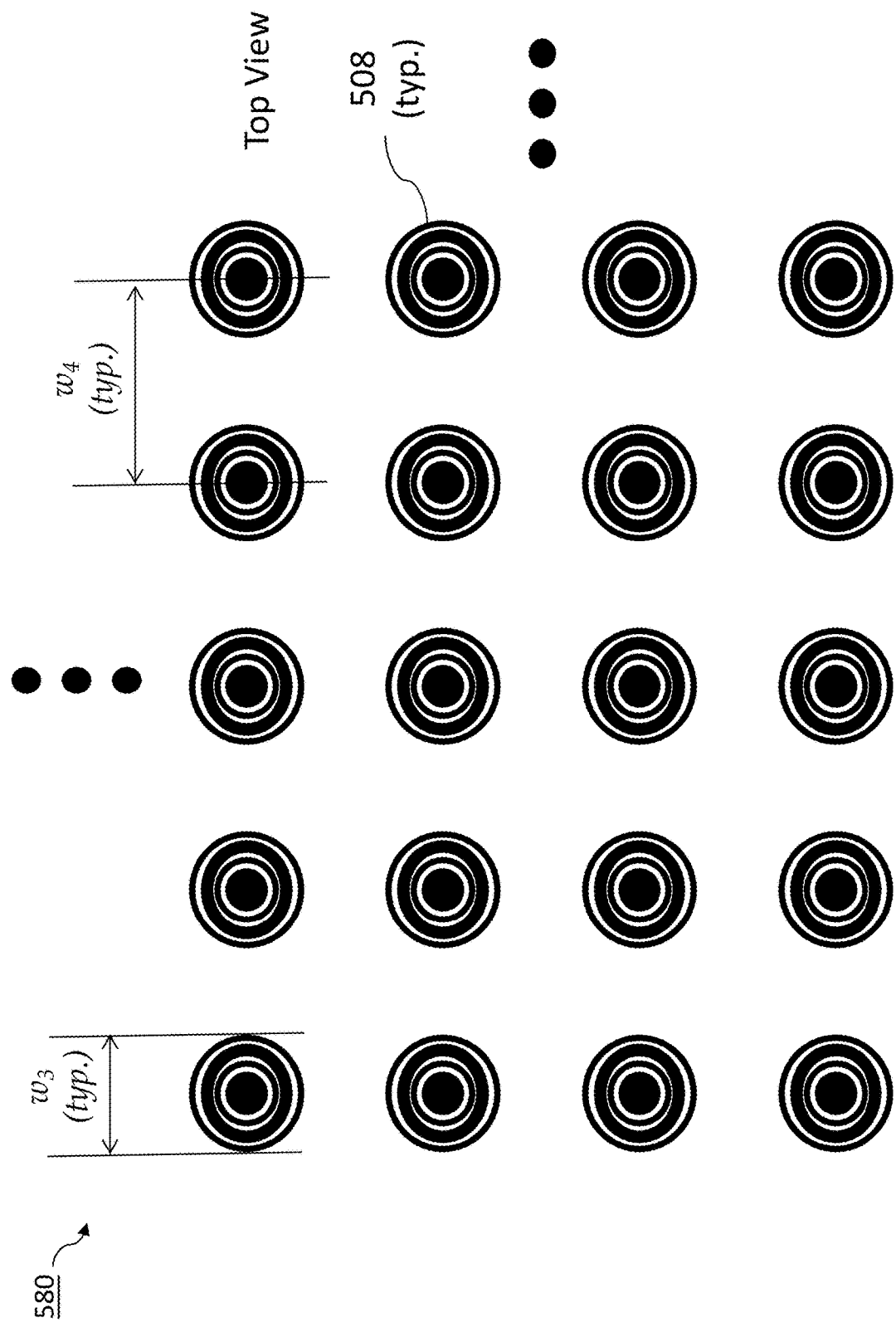

FIG. 5e depicts a top ("beam's eye") view of the SLM N×N array of subwavelength microdiffractive optical elements, similar to that of FIG. 4b, but with each element significantly reduced in area, thereby increasing the speed-of-response of the SLM.

Figure 5F:
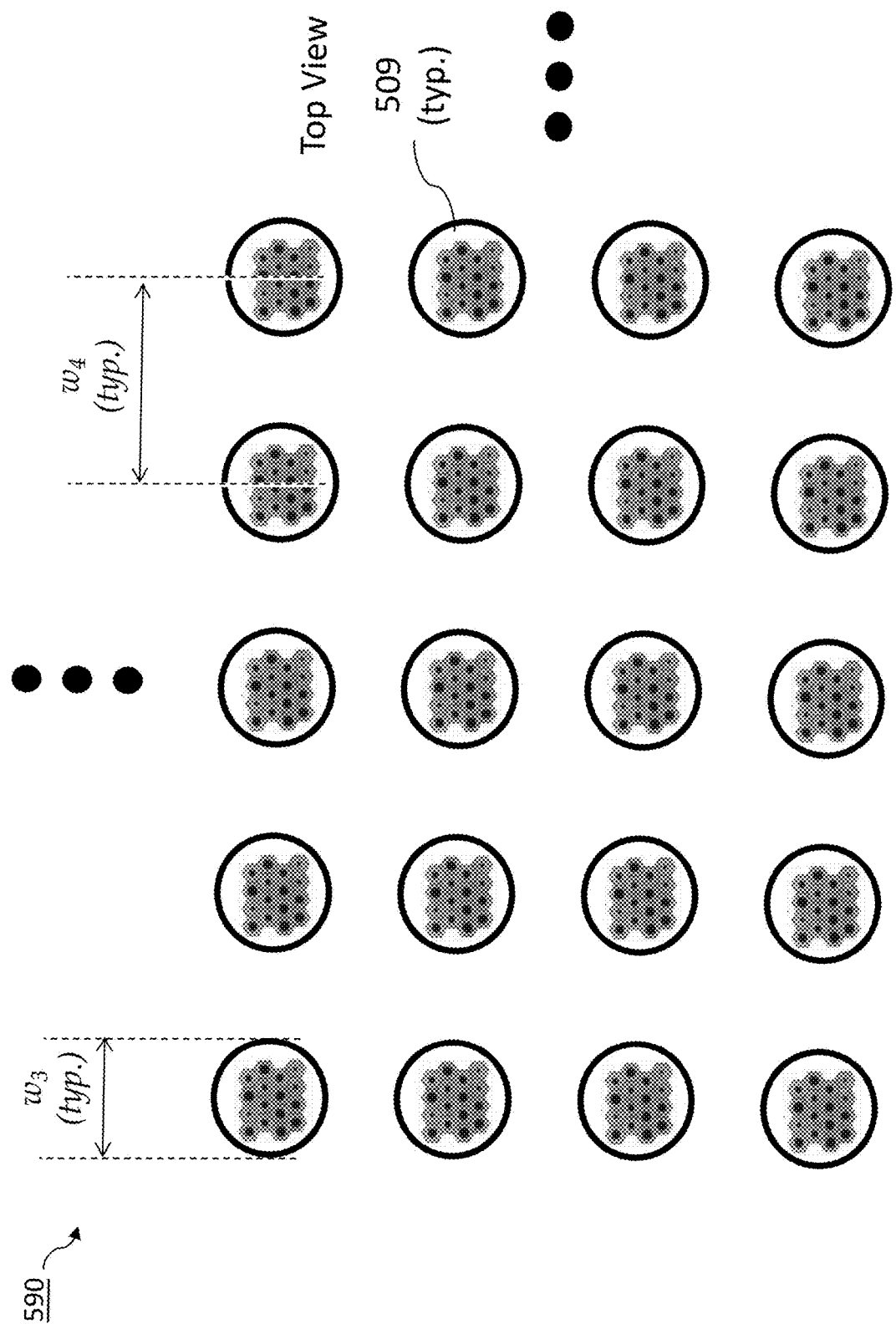

FIG. 5f depicts a top ("beam's eye") view of the SLM N×N array of subwavelength metasurface optical elements, similar to that of FIG. 5c, but with each element significantly reduced in area, thereby increasing the speed-of-response of the SLM. The gray background depicts a thin-film gold layer, formed underneath of each lower metasurface element.

Figure 6A:
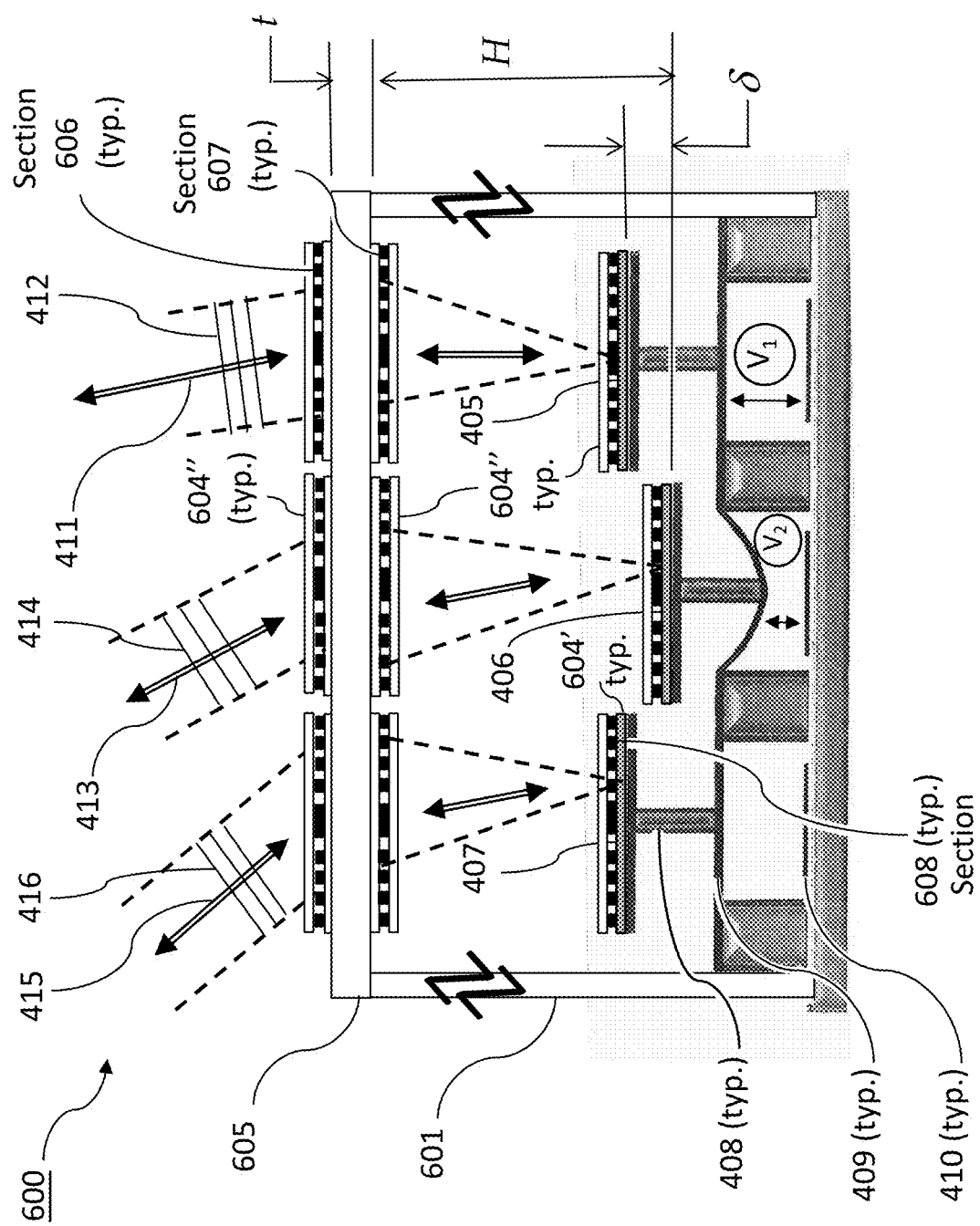

FIG. 6a depicts an exemplary embodiment of the present invention that employs an upper array comprised of subwavelength optical elements formed on both opposing surfaces of a substrate, mounted on superstructure (each surface can be comprised of a different array). This superstructure is positioned directly above the SLM so that each respective phase-only SLM planar segment element is aligned with each respective diffractive optical element or a metasurface formed on each segment. The combination emulates a phase-only SLM array, integrated with a cat's eye retro-array, emulating of a multi-lens optical train, such as a telecentric retroreflector.

Figure 6B:
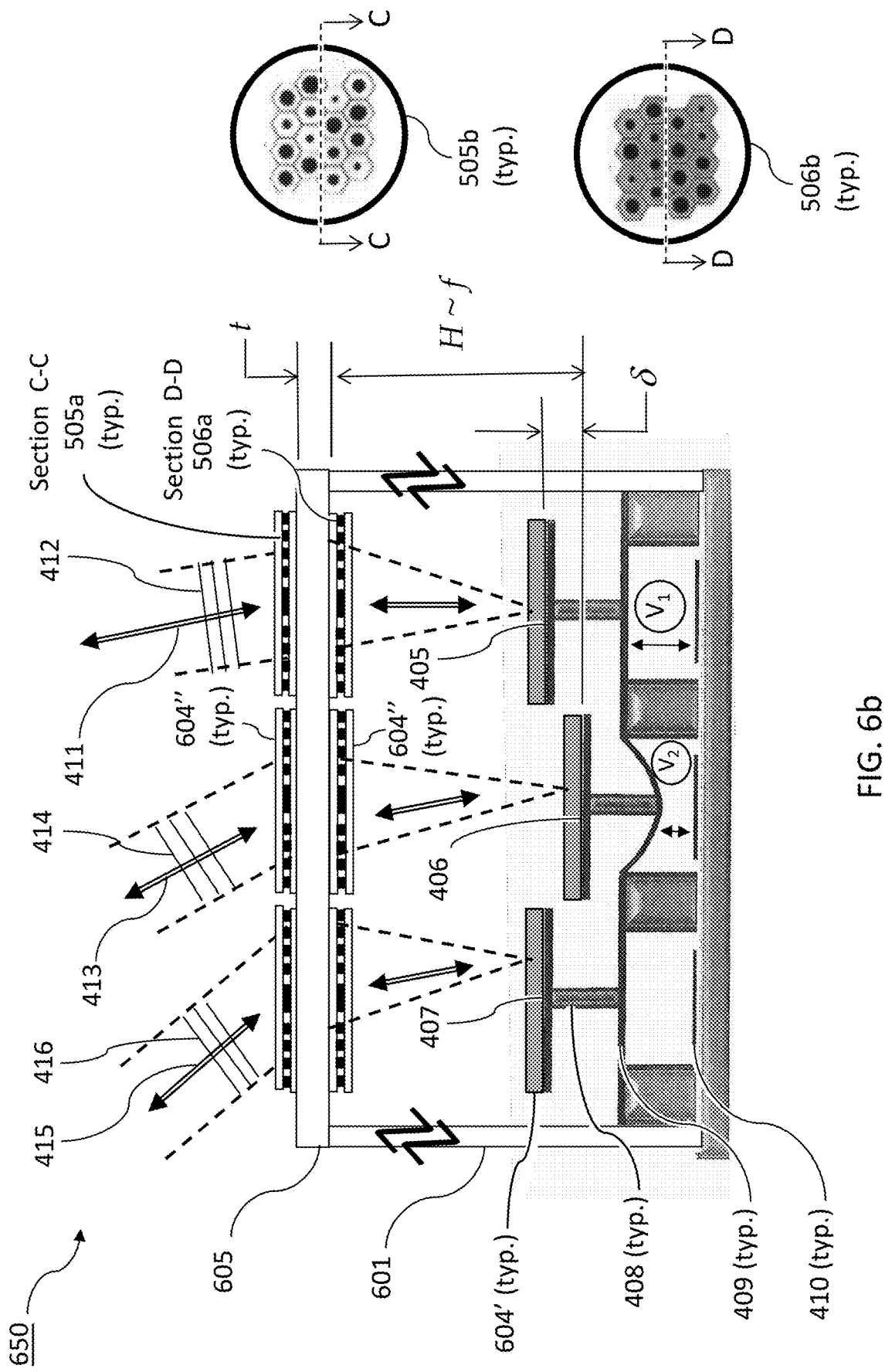
Figure 7:
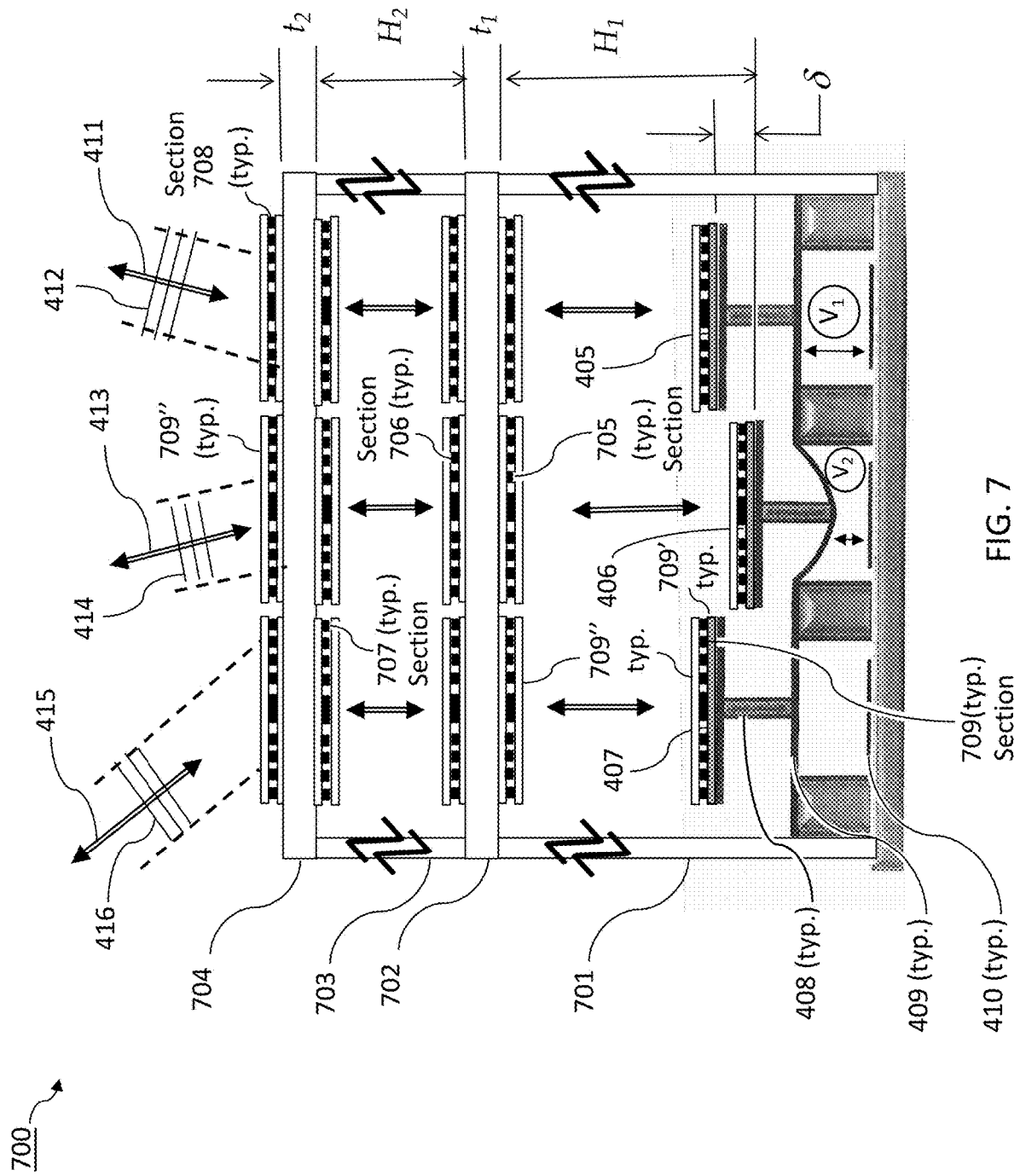

FIG. 6b depicts an exemplary embodiment of the present invention similar to that in FIG. 6a, except, now, the piston-driven planar segment is coated with a reflective, thin-film metallization layer which, when combined with each superstructure metasurface element, forms an array of cat's eye retro reflectors. The thin-film metallization layer minimizes mass loading of the MEMS device FIG. 7 depicts an exemplary embodiment of the invention that utilizes a dual superstructure architecture, with two levels of subwavelength arrays, registered directly above each other. Each level of the superstructure is comprised of array of subwavelength optical elements, formed on one or both opposing surfaces of each respective substrate. On each surface, the respective optical elements are identical for that given surface but can be different for each such surface. The combination of arrays emulates a phase-only SLM, integrated with a cat's eye retro-array using a multi-lens optical train or multi-metasurface optical train of arrays, such as a telecentric retroreflector.

Figure 8:
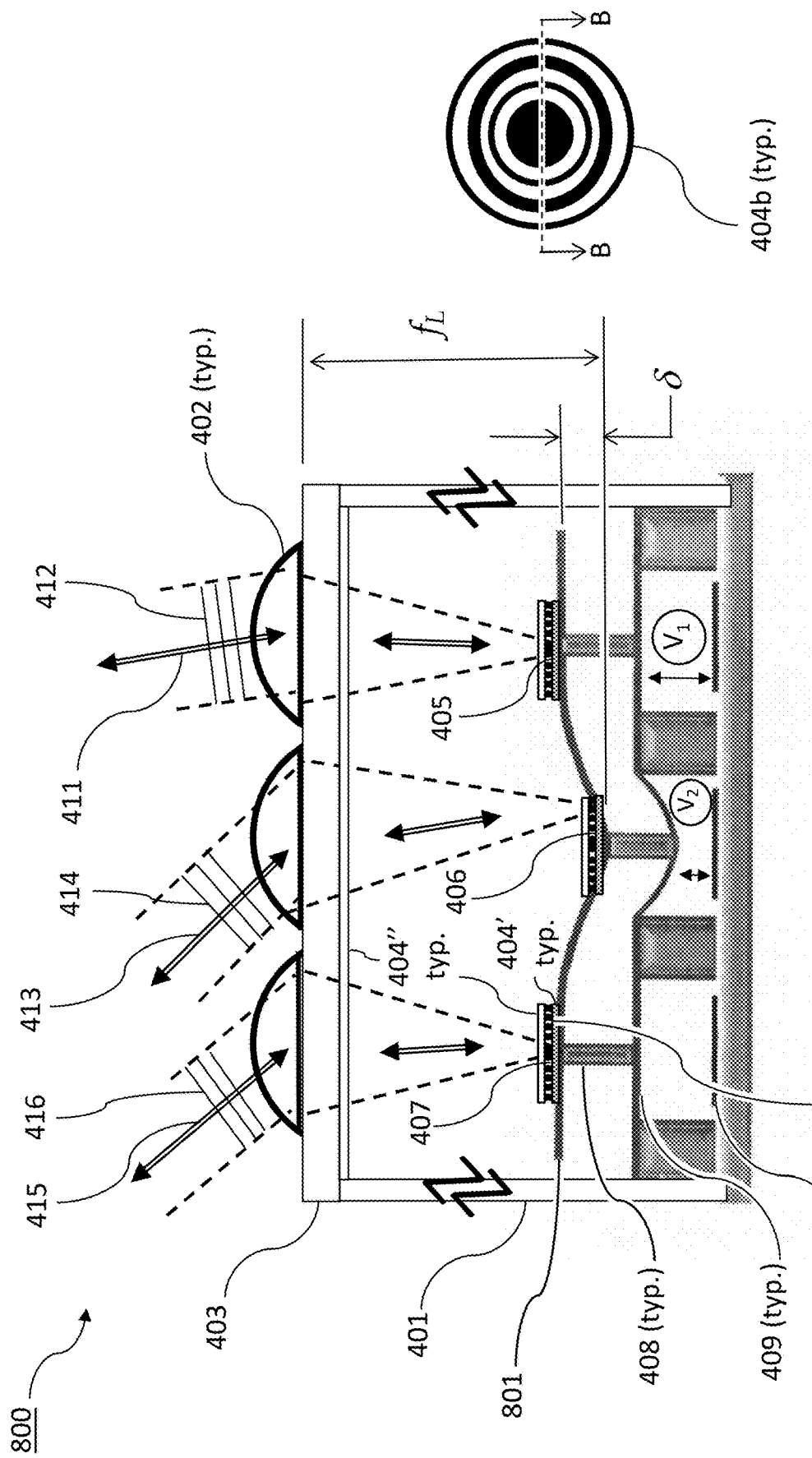

FIG. 8 depicts an exemplary embodiment of the invention depicting a microlens array integrated with a membrane-based SLM that employs an array of phase-only continuous "deformation" type of piston-controlled optical phase shifters. The microlens array is fabricated on a given surface of the substrate, mounted as a superstructure, with each microlens aligned above each respective phase-only SLM pixel. Each SLM reflective pixel is comprised of a subwavelength structure that emulates a concave, parabolic reflector or a metasurface.

This combination emulates a phase-only SLM, integrated with a cat's eye retro-array, while preserving the basic SLM dynamic response and form factor.

Figure 9A:
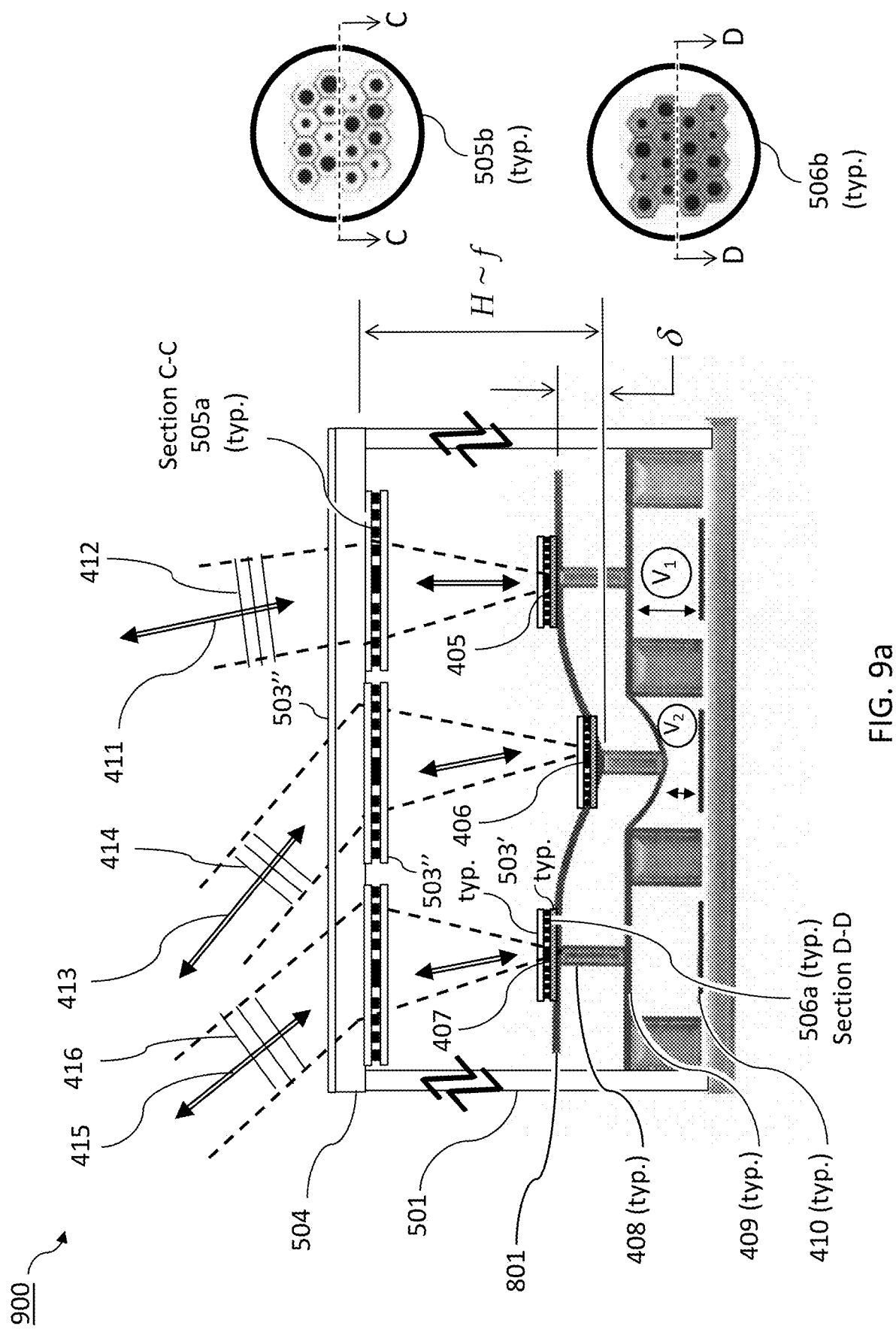

FIG. 9a depicts an exemplary embodiment of the invention depicting arrays of subwavelength optical elements, integrated with a SLM that employs an array of phase-only continuous, "deformation" type of piston-controlled optical phase shifters. The optical element array is fabricated as a superstructure with each metasurface element registered directly above each respective membrane "pixel" of the SLM, upon which is formed a metasurface array.

Each MEMS SLM reflective pixel is comprised of a subwavelength structure in the form of a metasurface element. The gray background depicts a thin-film gold layer, formed underneath of each lower metasurface element.

This combination emulates a phase-only SLM, integrated with a cat's eye retro-array, while preserving the basic SLM dynamic response and form factor.

Figure 9B:
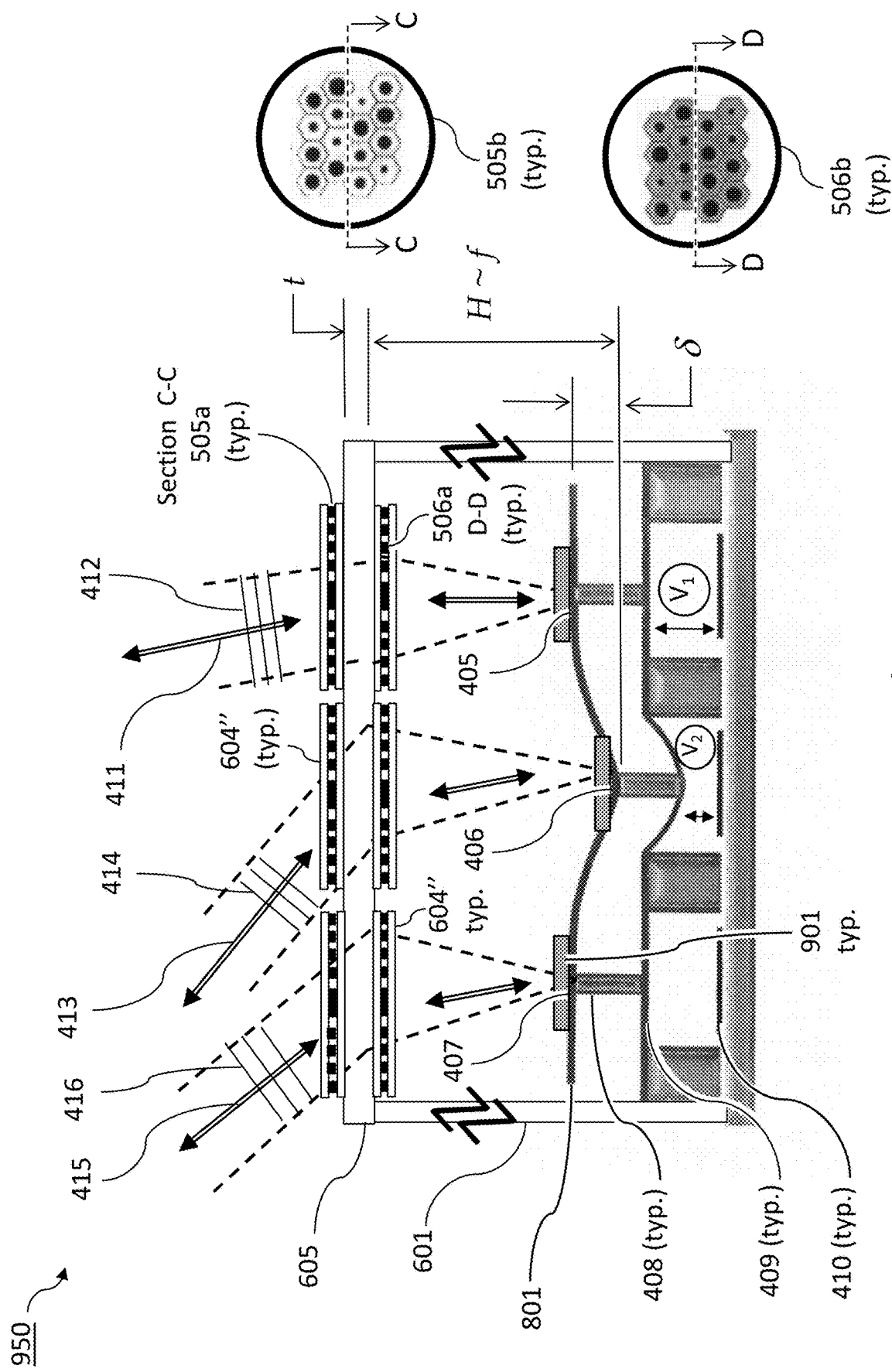

FIG. 9b depicts an exemplary embodiment of the present invention similar to that of FIG. 6b, except, now, the piston-driven membrane "pixel" is coated with a thin metallization layer directly below each respective metasurface element, which, when combined with each superstructure metasurface element pair, forms an array of cat's eye retro reflectors.

Figure 9C:
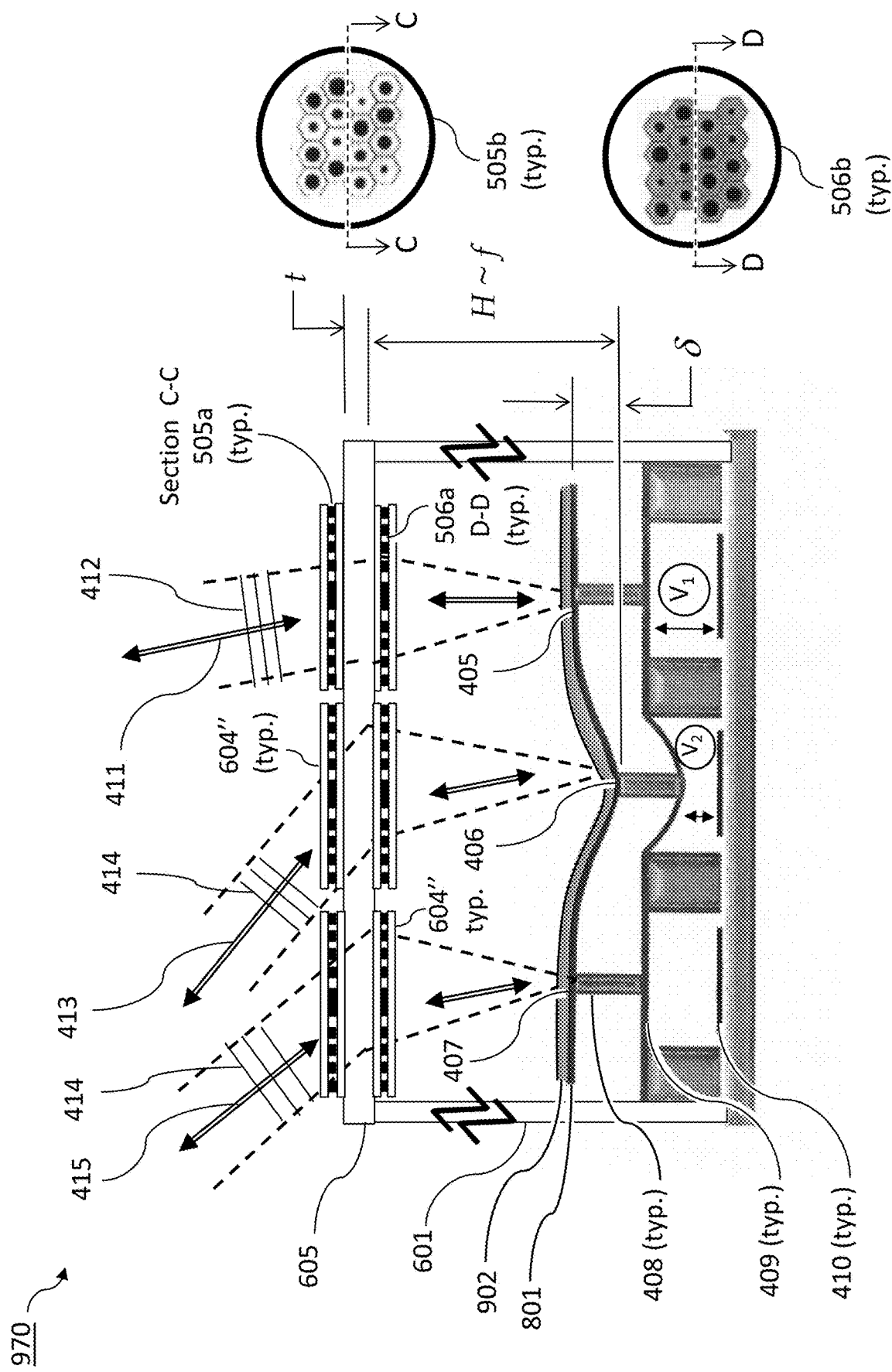

FIG. 9c depicts an exemplary embodiment of the present invention similar to that of FIG. 9b, except, now, the all piston-driven membrane "pixels" are coated with a continuous, thin metallization layer over the entire deformable membrane surface which, when combined with each superstructure metasurface element, forms an array of cat's eye retro reflectors. The metallization in this embodiment coats the entire membrane surface. The spatial phase modulator can be a MEMS-based SLM or can be a conventional deformable mirror (DM).

DETAILED DESCRIPTION OF THE INVENTION

The art, which is reviewed below (FIGS. 1, 2 and 3), pertains to phase-only MEMS spatial light modulators, which can serve the function of deformable mirrors, beam control, spectroscopy, adaptive optics or optical fiber array couplers. The art may be of interest to the reader when reviewing this description of the present technology.

Figure 1:
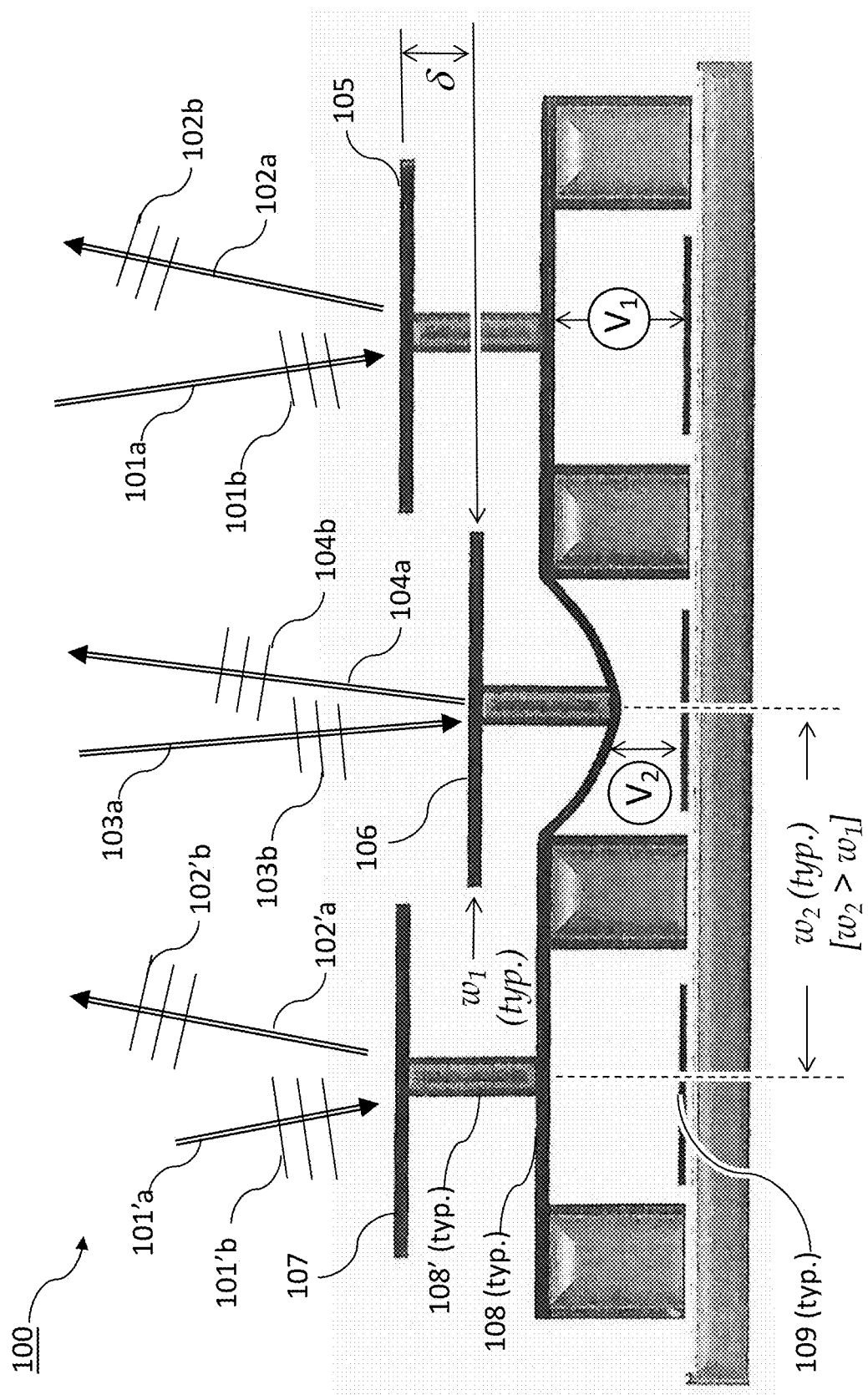
FIG. 1 shows a prior art, phase-only SLM that employs an array of segmented, planar reflective mirrors, mechanically driven by piston-like optical phase shifters (after Boston Micromachines Corp.). This device does not compensate for tilt errors.

Turning now to FIG. 1, an example of the prior art (manufactured by Boston Micromachines Corp.) includes a phase-only MEMS spatial light modulator (SLM) 100 which is comprised of an array of segmented, piston-driven planar reflective segmented elements, as depicted, as an example, by 105, 106 and 107, controlled by a voltage ($V_1$ and $V_2$, where, in this example, $V_2 > V_1$) applied to each pixel, between the ground plane 109 and each element of the conductive membrane 108, as shown in FIG. 1. The number of elements can vary between 10 to 1000 elements in each dimension. The pitch between each reflective pixel ($w_2$ in the figure) is on the order of 400 μm, and the width ($w_1$, lateral dimension) of each segment is slightly less than the pitch (i.e., $w_1 < w_2$), resulting in a fill factor >99.2%, thereby minimizing optical losses due to geometrical factors.

The goal of the SLM is to control the phase of light, on a pixel-by-pixel basis, incident upon the SLM, as shown by rays 101a, 101'a and 103a, and reflected as rays 102a, 102'a and 104a, respectively. It assumed that the incident light incident upon each reflective pixel is a plane wave, as shown by the respective equiphase surfaces, 101b, 101'b and 103b. Since the reflective surfaces are essentially flat, the reflected equiphase surfaces (102b, 102'b and 104b, respectively) are also planar.

The relative optical phase shift, $\varphi$, imposed onto each plane wave component is given as $\varphi = 4\pi\delta/\lambda$, where $\lambda$ is the wavelength of light and $\delta$ is the relative difference in the longitudinal position of the pistons 105, 106 and 107. The relative position of each piston, and hence $\delta$, is controlled electrostatically (in some cases, magnetically) by applying different voltages across the electrodes 109 and each respective piston flexible, conductive membrane 108. The greater the voltage, the greater the downward location of the piston, 108'; in the figure, $V_2 > V_1$. Each piston, 108', in turn, displaces a mirror segment, 105, 106 or 107, whose displacement is dictated by the voltage applied across electrodes 108 and 109. In the figure, the relative displacement of the mirror segments is shown by $\delta$. Note that the optical phase shift imposed onto an optical beam is a continuous function of the applied voltage. Hence, this class of device emulates an analog optical phase shifter array. In the figure, the ray 104a is delayed by 2□ relative to rays 102a and 102'a.

The stroke, $\delta$ (as quoted by Boston Micromachines Corp.), varies from 1.5 μm to 5.5 μm, depending on the particular device. The array sizes vary from 140 to 952 segments, and the response times (from 10% to 90% of the stroke) vary from 20 μs to 80 μs.

Note that, in general, a ray incident on one side of the normal is reflected at an equal angle to the opposite side of the normal, since the mirror element is flat and parallel to the SLM fixture. Therefore, tilt errors are not corrected by this particular SLM; hence, a motivating factor that underlies this invention.

Figure 2:
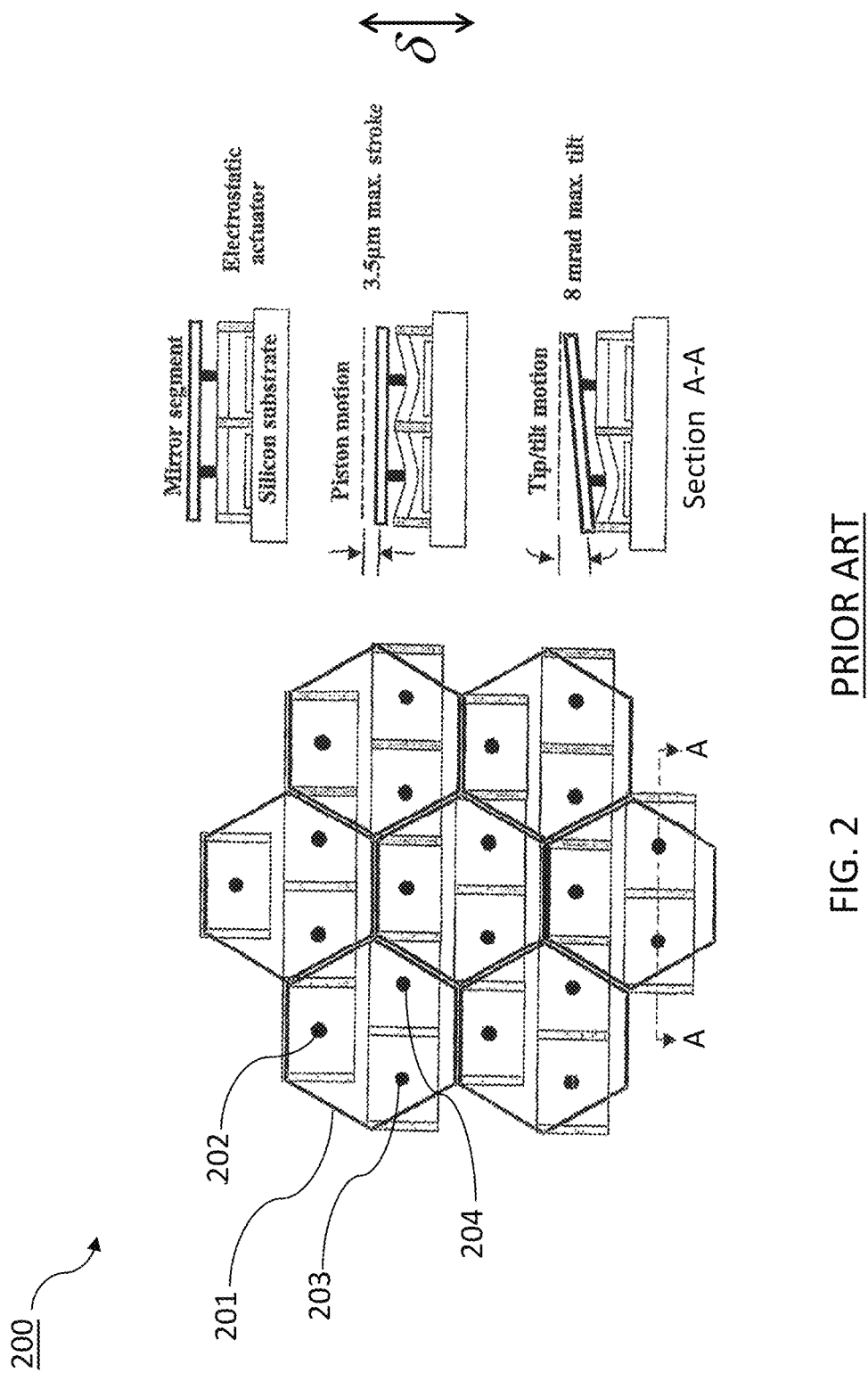
FIG. 2 shows a prior art SLM that employs three piston-like pixel shifters to realize both phase and tilt control of an optical beam in a closed-packed hexagonal pattern (after Boston Micromachines Corp.). Three piston-driven pixels are required for phase and tilt control of each optical pixel.

Turning now to FIG. 2, a commercial SLM manufactured by Boston Micromachines is shown 200 that provides optical phase control and well as tilt control, on an optical pixel-by-pixel basis. In this case three controllable segments 202, 203 and 204 (approximately 400 μm in lateral extent), arranged in a closed-packed hexagonal configuration 201, are required for control of each optical pixel. As shown in the FIG. 2 (see cross Section A-A) all three SLM segments provide piston motion ($\delta$) induced optical phase shifting ($\varphi$) when all three device segments are electrostatically controlled by the same voltage; and tilt motion when a pair of segments is electrostatically controlled by a differential voltage.

In this particular SLM, the maximum vertical piston motion ($\delta$) is quoted as 3.5 μm; thus, the maximum optical phase shift is twice the piston motion, or ~7 waves at a wavelength of $\lambda=1$ μm. The maximum tilt angle is quoted as 8 mrad. (Assuming that the segment length is 400 μm, one can estimate the tilt to be ~3.5 μm/400 μm=8.75 mrad.) Hence, to obtain the quoted tilt, the maximum differential piston range must be realized, which, in this case, provides only tilt control, but not piston phase-shifting. Hence, there exists a tradeoff between piston displacement (or, optical waves) and tilt angle.

The present invention increases the angular range (i.e., the field of view, FOV) by over an order of magnitude relative to that of FIG. 2, without sacrificing piston displacement; that is, in the present invention, one can obtain tilt compensation of ≥100 mrad versus 8 mrad (at the speed of light), while enjoying a displacement of 3.5 μm (or, ~7 waves of optical phase shift at □=1 μm)—the maximum quoted value of □ for this particular SLM.

Figure 3:
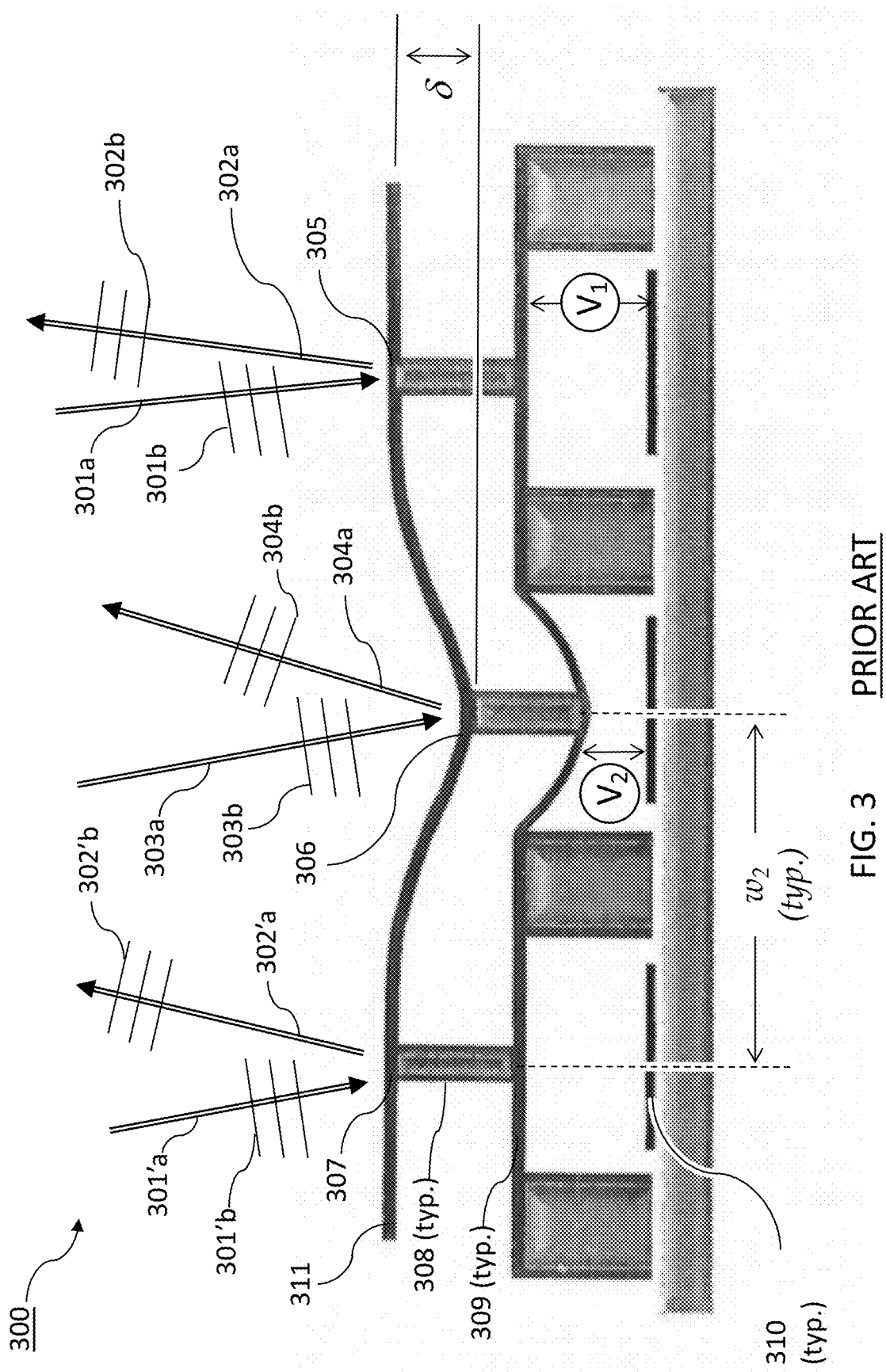
FIG. 3 shows a prior art, continuous, reflective membrane SLM that employs an array of phase shifters, each comprised of a local "deformation" of a thin membrane, driven electrostatically or via magnetic forces (after Boston Micromachines Corp.). This device does not compensate for tilt errors.

Turning now to FIG. 3, a commercial SLM manufactured by Boston Micromachines is shown 300 that provides optical phase control using an electrostatically (or, magnetically) piston driven, continuous reflective membrane 311. That is, as opposed to employing flat mirror segments (as in FIG. 1), the phase shift for this device, $\varphi = 4\pi\delta/\lambda$, is realized by reflecting the light from a locally deformed (contracted) continuous reflective membrane 311. Examples of pixel locations are shown as 305, 306 and 307.

As shown in FIG. 3, the basic SLM structure is similar to that of FIG. 1. A conductive membrane, 309, is locally deformed (contracted) via the application of a voltage between membrane 309 and a ground electrode 310. In this example, the voltage $V_2$ is greater than $V_1$, thereby locally deforming (contracting) the continuous reflective membrane 311 at location 306 by a distance, □, relative to that at locations 305 and 307. The array of pistons 308 defines the equivalent pixels of the device, which, in turn, locally displaces the continuous, reflective membrane 311 at pixelated locations, 305, 306, and 307. The pitch between each pixel, $w_2$, is on the order of 400 μm.

In this example, ray 303a will experience a greater phase shift, $\varphi=4\pi\delta/\lambda$, upon reflection (emerging as ray 304a) relative that of ray 301a (emerging as ray 302a) and ray 301'a (emerging as ray 302'a).

It is assumed that local equiphase surfaces of the waves are planar prior to (301b, 301'b and 303b), and upon reflection from (302b, 302'b and 304b, respectively) this SLM. As before, the optical phase shift imposed onto an optical beam is also a continuous function of the applied voltage. Hence, this class of device emulates an analog optical phase shifter array, similar to that of FIG. 1.

As before, however, tilt errors are not compensated by this SLM, since, in general, the incident angle of the ray is not normal to the SLM surface; hence, a motivating factor that underlies this invention. That is incident rays 301a, 301'a and 303a and its reflective rays, 302a, 302'a and 304a, respectively, do not overlap, but, instead, are angularly displaced. In addition, the respective equiphase surfaces of the incident (301b, 301'b, 303b) beams do not overlap with its respective reflective pairs (302b, 302'b, 304b). Hence, these MEMS devices do not compensate for tilt errors.

The present invention overcomes this limitation, enabling the device to impose a desired phase shift, $\varphi=4\pi\delta/\lambda$, over the entire range of the quoted piston stroke, while concomitantly compensating for local (piecewise) tilt errors, over a large FOV (approximately a factor of 10 greater than the prior art), all on a pixel-by-pixel basis.

Turning now to FIG. 4a, a detailed drawing of an exemplary embodiment of this invention is shown in 400. This embodiment emulates a compact, planar, phase-only SLM, possessing an integrated cat's eye tilt compensation function, over a wide field-of-view, FOV (greater than the prior art by an order of magnitude or more; ≥100 mrad vs. 8 mrad), without compromising the maximum piston displacement, δ. The overall device can be viewed as a phase-only SLM with a cat's eye retro reflector element integrated into each pixel of the device. The SLM/cat's-eye device can possess a number of resolvable pixels, ranging from 10 to 1000 in each dimension.

A cat's eye retro reflector is formed by the combination of a microlens element 402 and a parabolic reflector element, 404a. The longitudinal position of the parabolic element, in turn, is controlled by the MEMS device. The overall device performs the combined function of phase-control and retro reflection of an optical beam for each pixel of the SLM array.

In this embodiment, a segmented SLM is employed; recall FIG. 1. A subwavelength reflective structure, element 404a (404b; cross section B-B) is formed on a dielectric, semiconductor or metallic thin film 404', on the surface of each mirror segment, 405, 406 and 407 in the array (the mirror segments can be in the form of a square or a circular element).

Each structure element 404a is identically designed to emulate a parabolic reflecting element. A representative example of such a structure is shown in 404b, whose cross section B-B is shown as 404a. Owing to the symmetry of the system, each structure 404a is symmetric about a vertical axis. Note that the subwavelength element 404a need not necessarily be a set of annular rings or ellipses; the figure shows a representative structure. The elements 404a can be in the form of a planar microdiffractive optical element, Zone plate, Fresnel reflector, a subwavelength high-contrast grating or a metasurface.

FIG. 4b shows a top (beam eye) view of the SLM identical array elements 404b. In this case, the width of the individual element, $w_1$, is less than the center-to-center spacing, $w_2$ (i.e., $w_1 < w_2$). Typically, these values are nearly equal, assuring a large fill factor (≥99.2%), thereby minimizing optical losses. The segments are antireflection coated by thin film 404" to minimize spurious reflections at the air-element interface.

Since the elements that comprise the structure is subwavelength in height, width and length, the composite structure (element 404a) adds negligible mass to each mirror segment 405, 406 and 407 (relative to that of the basic device of FIG. 1) and, hence, does not materially perturb the mechanical properties of the SLM or its required drive voltages or its temporal response.

The basic device is similar to that of FIG. 1, namely, upon the application of a voltage across the electrodes (e.g., 409 and 410), the membrane 409 will locally contract (depress) proportional to the voltage (e.g., $V_1$, $V_2$) in a continuous manner, resulting in an analog, phase-only MEMS device. The displaced membrane, in turn, drives each segment via a piston motion by an array of pistons 408, each of which controls the displacement of respective segments (in this example, segments 405, 406 and 407).

In this example, the relative phase shift upon reflection of an optical beam is greater for segment 406 than for either segment 405 or 407. The SLM is designed to realize a maximum displacement, □, relative to the other elements, where $V_2 > V_1$ as shown.

The relative optical phase shift, $\varphi$, imposed onto each plane wave component (411, 413, 415) is given as $\varphi=4\pi\delta/\lambda$, where λ is the wavelength of light and δ is the relative difference in the longitudinal position (i.e., vertical displacement) of the segmented mirrors.

A microlens array (conventional, aspheric, etc.), comprised of microlenses 402, is formed on substrate 403. A stationary superstructure is formed by substrate 403 and spacer 401. Each microlens 402 of the array is positioned to be directly above each respective planar, segmented element 404a of the SLM (in this example, 405, 406 and 407). The underside surface of substrate 403 (the substrate surface facing the planar reflective segments 405, 406, 407) is antireflection coated 404" to minimize reflective losses, and, further, to minimize refraction at the air/substrate interface.

Note that the microlens array 402 can be in the form of an array of low mass, relatively flat microdiffractive optical elements, holographically formed microlenses, Fresnel micro-zone plates or subwavelength high-contrast gratings, typically comprised of Si subwavelength structures on a SiO$_2$ substrate.

The height of the substrate 403 above the SLM segmented mirror structure is nominally given by $f_L$, where $f_L$ is approximately given by the focal length of the microlens elements 402. The effective radius of curvature of the equivalent subwavelength reflective, parabolic, segmented elements 404a is equal to 2×$f_L$.

This configuration forms a cat's eye retro-reflector comprised of each microlens 402 of the array and each respective segmented parabolic mirror element 404a of the SLM.

Hence, each pixel of the combined optical elements forms a cat's eye retro reflector with an independent optical phase-shifting capability, $\varphi=4\pi\delta/\lambda$, where $\delta$ is a function of the voltage, V, applied across each pair of conductive electrodes, 409 and 410. Thus, a phase-only SLM array is realized, integrated with a retro-reflective tilt-compensation array, all on a piecewise, pixel-by-pixel basis.

Note that the drawing is not to scale, since $\delta$ is on the order of microns, the focal length, $f_L$, is nominally between 10 and 1000 microns and the pitch between microlenses is on the order of 400 μm.

Since the microlens array is mechanically decoupled from the moveable piston (viz., it is supported by a superstructure), it adds zero mass to the basic SLM segmented pistons and does not inhibit or impede its motion. That is, the only element of the basic SLM that is modified mechanically is in the form of the small additional mass of the reflective structure 404a (and 404b) formed on the planar segment. The mirror substrates segments (405, 406, 407) can be reduced in mass (thickness) by the small amount of the added mass of the microstructure, thereby effectively maintaining the same total mass of the originally designed SLM segmented mirror. Hence, the response time and maximum phase shift of the SLM/cat's eye system is essentially the same as for the original SLM; and the form factor (footprint) of the basic MEMS SLM is not materially modified.

Note that it is critical that the piston displacement, $\delta$, be less than the optical system Rayleigh length, $z_R$, in order to faithfully perform the function of a retro-directive element over the range of the displacement, $\delta$, while concomitantly imposing the desired range of continuous phase shifts upon the retro reflected beam. Since $z_R \sim \pi\lambda(f/\#)^2$ of the system, where f/# is the f-number of the system, this requirement (i.e., $z_R \geq \delta = 3.5$ μm) is met over the range of the typical SLM phase shifts for $\lambda=1$ μm and for f/#$\geq$1. Hence, the SLM/cat's-eye system faithfully maintains the retro-reflection property over the maximum range of optical phase shifts imposed by a typical SLM.

During operation, rays 411, 413 and 415 (corresponding to a piecewise incident composite optical beam) are incident upon the device, all with respective planar equiphase surfaces, 412, 414 and 416, respectively and, all at different angles of incidence in general. Owing to the retrodirective property of the device, the retro-beams return along the same path as their incident counterparts—hence, the double (back-to-back) arrows for optical rays 411, 413 and 415—and, moreover, each incident beam maintains the same equiphase wave fronts, 412, 414 and 416 upon retro reflection. Therefore, the equiphase surfaces of the incident and retroreflected beams overlap.

Note that incident (piecewise) tilt errors are compensated by the device, at the speed of light through the device, over its entire FOV. Since the retro-reflection function is passive in nature, no control voltages are required for tilt compensation relative to the prior art (recall, FIG. 2).

The desired optical phase shift is imposed on the retro-reflected beam by the action of the planar segments 405, 406 and 407, over its entire range of relative displacements, $\delta$, without compromise. Hence, as opposed to the tip-tilt SLM of FIG. 2, there is no phase-shift/tilt-angle tradeoff in the present invention. Moreover, the FOV of the present invention (i.e., the tilt compensation angular range) is at least an order of magnitude greater than that of the prior art ($\geq$100 mrad vs. 8 mrad).

Turning now to FIG. 5a, a detailed drawing of an exemplary embodiment is shown 500. This embodiment is similar to that of FIG. 4, except, now, the microlens array (recall the array formed by microlenses 402) is replaced by a planar subwavelength microstructure array, comprised of identical optical lens elements 505a (505b; cross section C-C), including, but not limited to microdiffractive optics, holographically formed microlenses, micro-zone plates, subwavelength high-contrast gratings (typically Si gratings on a $SiO_2$ substrate), metasurfaces or high-aspect ratio inverse-designed holey metalenses.

In the example shown (505b), a metasurface transmissive lens is depicted. A "beam's eye" view of the array of elements 505b is shown as 550 in FIG. 5b. A typical metasurface transmissive lens 505a (505b; cross section C-C) is comprised of an array of amorphous silicon nanoposts, each of diameter 68 to 288 nm, 600 nm tall, arranged in a hexagonal lattice constant of 450 nm, and 400 μm in total width ($w_1$ in FIG. 5b, where the pitch, $w_2 \geq w_1$), formed on a fused-silica substrate. The nanopost array is covered with a layer of SU-8 polymer followed by a 150 nm thick film of hydrogen silsesquioxane, that latter functioning as an antireflective coating, at an operating optical wavelength of 850 nm, to minimize spurious reflections and refractions.

A superstructure is employed that supports a substrate 504 using a spacer 501, in a manner similar to that of FIG. 4a, and which does not impede the motion of the SLM pistons 405, 406 and 407. The height H of the superstructure is approximately equal to the height of the spacer 501, which is approximately equal to the effective focal length of the metasurface lens 505a.

The microstructure array of elements 505a is formed upon one surface of substrate 504 that faces the SLM pistons 405, 406 and 407. The array of elements 505a is aligned with the respective SLM elements 506a, a latter element of which is formed on each piston-driven planar segment 405, 406, and 407. Elements 505a and 506a are antireflection coated by thin film 503" to minimize spurious reflective losses.

The opposing surface of substrate 504 (the surface that faces the incident optical beam 411, 413 and 415) is comprised of an antireflective thin film coating 503" to minimize spurious reflective losses.

The elements 505a [505b] of the array are arranged in a closed-packed configuration, as shown by the "beam's eye" view, 550 [560], in FIG. 5b [5c], where the diameter of each element 505b [506b] is given as $w_1$ and the pitch (spacing) between elements, $w_2$, is slightly greater than $w_1$ (i.e., $w_2 \geq w_1$) to maximize the fill factor of elements 505b. As described in FIG. 5a, all array elements in this embodiment can be rectangular (square) in shape or circular in shape or comprised of nanoposts, the latter in the case of a metasurface.

Returning to FIG. 5a, the planar surface of each SLM piston-driven segment (e.g., 405, 406 and 407) has a subwavelength periodic structure formed on each respective surface, as shown by 506a (506b; cross section D-D), formed on a gold thin film 503'. In this case, the "beam's eye" view of the SLM array 506b is shown as 560 in FIG. 5c. In this example, the element 506b is a metasurface, with a similar structure as that of 505a.

The combination of each microstructure lens element 505a with each planar reflective segment element 506a (in conjunction with the thin film metallization layer 503'), forms an independent (planar) cat's eye retro reflector for each pixel of the SLM.

The ensemble of superstructure optical array elements 505a with the respective SLM array segmented planar elements 506a results in a compact, planar cat's eye retro-reflector array, with each retro reflector capable of imposing an optical phase shift upon an incident beamlet 411, 413 and 415, via the applied voltage, V.

Note that the optical phase shift imposed onto an optical beam is a continuous function of the applied voltage. Hence, this class of device emulates an analog optical phase shifter array, integrated with a retroreflective compensation capability on a pixel-by-pixel basis.

In general, there are at least two different classes of optical element pairs (505a, 506a) that can be realized, each combination of which results in a retro reflector. In both classes of device, the combination of elements yields a cat's eye retro-reflector with a field-of-view (FOV) that is over an order of magnitude greater than the FOV of the prior art tip-tilt SLM (recall FIG. 2).

In one case, element 505a emulates a subwavelength focusing lens and 506a emulates a subwavelength parabolic reflector, the combination of which results in a cat's eye retro-reflector, over a wide FOV. Examples of elements 505a and 506a include, but are not limited to, diffractive optical elements, subwavelength zone plates, Fresnel optics, and subwavelength high-contrast gratings, as depicted in FIG. 4b. In these cases, the thin film 503' is typically comprised of a dielectric or semiconductor thin film.

In another case, elements 505a and 506a are metasurfaces, comprised of subwavelength structures, such as arrays of amorphous silica nanoposts formed on a fused silicon substrate, as described above. In this case, metasurface 505a emulates a focusing element that focuses light with different incident angles onto different points along a gradient metasurface 506a (equivalent to a Fourier transform operation). Metasurface 506a, in turn, imparts a spatially varying photon momentum at twice the incident, in-plane momentum, onto the incident beam upon transmission through the metasurface and reflection from the thin metallization layer 503'. In this case, the thin film 503' is typically comprised of a gold thin film of thickness 100 nm. As is the case of element 505a, the exposed surface 506a is typically overcoated with a protective layer of a polymer, such as SU-8. The exposed surface of the SU-8 polymer, is, in turn, coated with a quarter-wave antireflective layer, such as a 150 nm thin film of hydrogen silsesquioxane 503' for operation at a wavelength of 850 nm.

The result in either case is that this combination of subwavelength optical elements emulates a compact, planar cat's eye retro-reflector that functions over a large set of incident angles (+/−50°). Moreover, the piston-driven MEMS planar segment imparts a continuous, controllable phase shift onto an incident optical beam.

Both classes of retro-reflectors described above are passive (no control voltages required), operate at the speed of light through the device, and are compatible with the SLM piston drive, resulting in a retro reflector array, integrated with a phase modulated SLM array, all on a pixel-by-pixel basis, and suitable for many adaptive optical applications. Note that, as opposed to that of FIG. 2, this class of device does not possess a phase-shifting/tilt-compensation (FOV) penalty tradeoff.

The retro-reflective property of this SLM is depicted by the rays 411, 413 and 415 (note the back-to-back arrow rays), whose respective planar equiphase surfaces (412, 414 and 416) are the same for the incident and for the retro-reflected beams; that is, each incident equiphase surface overlaps with each respective retro-reflected equiphase surface, resulting in a piecewise tilt compensation over the FOV of the device.

It is noted that, in myriad existing adaptive optical systems, there are at least two different deformable mirror (DM) devices in a given system. One DM services low-spatial frequency, long-stroke optical distortions (i.e., large phase errors) over a large FOV; and, the other DM device services high-spatial frequency, short-stroke optical distortions (i.e., small phase errors) over a small FOV—resulting in a so-called "woofer-tweeter" configuration. By virtue of the large FOV of the classes of the SLM/cat's eye retro reflector described herein, this invention can relax the dual deformable mirror design constraints, while increasing the design parameter space of "woofer-tweeter" adaptive optical systems.

Turning now to FIG. 5d, an exemplary embodiment of this invention is depicted 570 that exploits the focusing property of the microlens array elements 505'—the diffractive optical elements (FIG. 4c) or metasurface embodiments (FIG. 5b)—to realize a lower-mass set of SLM mirror segments. Since the focused incident beams need not span the entire lateral dimension of the planar segments 405, 406 and 407 of the SLM to result in a desired device FOV, the diameter of these segments can be reduced and still accommodate the focused beams over a reasonable FOV. This is shown in FIG. 5d, where 570 depicts a reduced dimension of the planar segments 405, 406 and 407. The resultant subwavelength elements are shown by 505" deposited on a dielectric, semiconductor or metallization thin film 503'. The other callouts and descriptions the embodiment of FIG. 5d are similar to those of FIG. 5a. The subwavelength elements 505" can be in the form of subwavelength diffractive optics or subwavelength metasurfaces.

In the former case, turning now to FIG. 5e, a "beams-eye" view of the segmented subwavelength microdiffractive optical array elements 508 is shown 580, which can include, zone plates, Fresnel optics or high-contrast gratings (recall description with respect to FIG. 4b).

In the latter case, turning now to FIG. 5f, a "beams-eye" view of the segmented subwavelength metasurface optical array elements 509 is shown 590 (recall description with respect to FIG. 5c).

In both cases, the diameter of the planar segments 405, 406, 407 in the array ($w_3$) can be less than the pitch between segments ($w_4$). Hence, the mass of the elements is reduced approximately by the ratio of $(w_3/w_4)^2$, thereby enhancing the performance of the overall device. In this case, the response time of the SLM system can be improved for the same drive voltages, while maintaining the device phase modulation of the retro-directed beam over the desired FOV.

Turning now to FIG. 6a, an exemplary embodiment is shown, 600, that is similar to that of FIG. 5a, except now, subwavelength diffractive optical elements (or metasurfaces) are formed on both opposing surfaces of the substrate 605. Elements 606 are formed on the substrate surface 605 facing the incident optical beams 411, 413 and 415. Elements 607 are formed on the substrate surface 605 facing the planar mirror segments 405, 406 and 407. Antireflective coatings 604" are formed on all air-interface surfaces.

The pair of arrays (606 and 607), in conjunction with the planar SLM piston-driven elements 608, forms a compact, planar cat's eye retro-reflector for each pixel, with continuous, analog optical phase shifting capability via the SLM. Each array of elements (606, 607, 608) is arranged in a closed packed configuration, similar to that of FIG. 5b, 550. The exposed surfaces of elements 606, 607 and 608 are all antireflection coated 604" to minimize spurious reflections and refractions at the respective air/element interfaces.

This embodiment provides for the realization of other robust, compact, planar, classes of cat's eye configurations. Examples include, but are not limited to, planar structures emulating bulk optical telecentric focusing systems, compound lenses and aspheric lens arrays, and higher order metasurface systems, now using compact, rugged, planar, subwavelength elements. The subwavelength structures 606, 607 and 608 can be diffractive optical elements, high-contrast gratings, metasurfaces or combinations thereof. These subwavelength structures are formed on a dielectric, semiconductor or gold thin film 604'.

In all cases, the device provides retro-reflection, with phase shift control, capabilities of all incident optical beams. Note that the rays 411, 413 and 415 are drawn as back-to-back arrows, signifying the compensation for tilt errors over a large FOV.

As shown in FIG. 6a, a superstructure is formed over the SLM piston array of segmented planar surfaces (405, 406, 407), comprised of substrate 605 and spacer 601 of height H. Note that the superstructure does not interfere or impede the motion of the SLM piston-driven segmented planar surfaces. The basic operation and functionality of the SLM (and the callouts) are similar to those as described with respect to FIG. 5a.

Note that the drawing is not drawn to scale. As an example, the thickness of the substrate, t, can range from 50 µm to 5000 µm, the spacer height, H, can range from 10 µm to 5000 µm, and the piston displacement, □□ can range from 1 µm to 10 µm or more.

Turning now to FIG. 6b, an exemplary embodiment is shown 650 that depicts a continuous, phase-only SLM with integrated tilt control using a SLM with a thin metallization coating 604' on the planar segments 405, 406 and 407. In some cases where a metasurface element 603a is employed, the underside of the element is fabricated with a conductive layer for its functionality. In this case, the metallization thin film is coated on the continuously (analog) driven planar segment surface that faces the metasurface element 603a. Note that the exposed surfaces of the elements 602a and 603a are antireflection coated (602', 603') to minimize (respective) air/element interface spurious reflections and refractions.

Since the metallization layer 604' is in the near field of the metasurface element 603a, its functionality is unaltered relative to direct contacting of the metallization layer with the given element, over the piston displacement range, □. Hence, the combination of the elements 602a, 603a and 604' with the SLM forms a planar cat's eye retro reflector with continuous phase shifting capability, on a pixel-by-pixel basis.

As is the case of FIG. 6a, note that the drawing is not drawn to scale. As an example, the thickness of the substrate, t, can range from 50 µm to 5000 µm, the spacer height, H, can range from 10 µm to 5000 µm, and the piston displacement, δ, can range from 1 µm to 10 µm or more.

Note that the optical phase shift imposed onto an optical beam is a continuous function of the applied voltage. Hence, this class of device emulates an analog optical phase shifter array with passive retro reflection and tilt compensation.

Turning now to FIG. 7, an exemplary embodiment is shown that is an extension of that described with respect to FIG. 6a. In this embodiment, two superstructures, comprised of a respective substrate 702 and 704, are formed over the SLM using respective spacers 701 and 702. Arrays of subwavelength diffractive optical elements (or metasurfaces) 705 and 706 are formed on opposing surfaces of substrate 702; and additionally, arrays of subwavelength diffractive optical elements (or metasurfaces) 707 and 708 are formed on opposing surfaces of substrate 704. The combination of elements 705, 706, 707 and 708, in conjunction with the elements 709 on the planar moveable segments 405, 406 and 407, each form a cat's eye retro reflector, over each respective, piston driven optical phase shifting SLM element, 405, 406 and 407. The subwavelength structure 709 is formed on a dielectric, semiconductor or gold thin film 709'. The exposed element (705, 706, 707, 708, 709) surfaces are antireflection coated (not shown) to minimize (respective) air/element interface spurious reflections and refractions.

The result is an array of cat's eye retro reflectors integrated with a continuous (analog) optical phase shifting SLM array, on a pixel-by-pixel basis. This is illustrated in the figure by rays 411, 413 and 415, where the incident and retro-directed rays overlap (hence, back-to-back arrows); as well as the overlap of the respective incident and retro-directed equiphase surfaces 412, 414 and 416.

The presence of a second superstructure and respective optical elements provide additional degrees of freedom in the optical design of the cat's eye retro reflector, resulting in more complex and robust, equivalent planar compound lens optical trains and telecentric based retros.

The height of substrate 702 (of thickness $t_1$), above the SLM is given by $H_1$; whereas, the height of substrate 704 (of thickness $t_2$), above the substrate 702 is given by $H_2$. The relative displacement of the SLM planar segments, □, is controlled by drive voltages $V_1$ and $V_2$, resulting in a continuous optical phase shifting property of the SLM. Note that motion of the planar array segments 405, 406 and 407 is not impeded by the superstructure. Hence, the dynamic properties and response parameters of the basic SLM are not compromised by the presence of the superstructure.

Note also that the drawing is not drawn to scale. As an example, the thickness of the substrates, $t_1$ and $t_2$, can range from 50 µm to 5000 µm; the spacer heights, $H_1$ and $H_2$, can range from 10 µm to 5000 µm; and the piston displacement, δ, can range from 1 µm to 10 µm or more. Note that the optical phase shift imposed onto an optical beam is a continuous function of the applied voltage. Hence, this class of device emulates a compact, planar analog optical phase shifter array, with passive tilt compensation.

Turning now to FIG. 8, an exemplary embodiment of the invention is shown 800, comprised of a basic SLM (recall FIG. 3), integrated with a cat's eye retro-reflector, on a pixel-by-pixel basis. The basic device is comprised of a microlens array 402 and a deformable membrane 801. (Note that this embodiment is opposed to that of FIG. 4a, which depicts a microlens array and a segmented, planar piston-driven mirror array, instead of a deformable membrane in this case.)

This class of SLM employs a continuous membrane 801, which is locally pixelated (405, 406 and 407) by an array of pistons 408, and is driven by the pixelated deformation of a conductive membrane 409 and a ground plane 410 for each pixel. This results in a SLM array with continuous phase control and passive tilt compensation of multi-pixel optical beams. The other callouts and the optical beam functionality are similar to that of FIG. 4a.

Note that this class of SLM is functionally equivalent to that of a conventional deformable mirror, DM. Hence, the details of this embodiment apply to conventional deformable mirrors (i.e., with continuous phase shifting capability, such as piezo-driven, large-area DMs). That is, the invention provides for a conventional DM with passive tilt compensation and phase control over a wide FOV.

As described in FIG. 3, voltages $V_1$ and $V_2$ (where $V_2 > V_1$) are applied across a conductive membrane 409 and a ground plane 410, on a pixelized basis, which electrostatically (or magnetically) displaces the conductive membrane, with a relative displacement, d, as shown in FIG. 8. Pistons 408 are displaced longitudinally by the applied control voltage, which, in turn, deform (contract) the membrane 801 at the pixel locations, 405, 406 and 407.

A microdiffractive, high contrast grating or metasurface subwavelength structure element 404a (404b; cross section B-B) is formed on the continuous membrane at each pixel location, thereby forming an array of parabolic reflectors, the displacement of each is controlled by the SLM at each pixel location 405, 406 and 407. The subwavelength structure 404a (404b; cross section B-B) is formed on a dielectric, semiconductor or gold thin film 404'. Note that the thin film 404' can be deposited over the entire surface of the membrane, as deemed necessary in the fabrication process. The exposed surface of element 404a is antireflection coated 404" to minimize spurious reflections.

It is to be noted that the small deformation during device activation does not alter the subwavelength structure appreciably, since the pitch is 400 μm and the stroke is order 3.5 μm; hence, the deformation modifies the microstructure dimensions less than 1%, which is within reasonable tolerances.

A superstructure is formed by substrate 403 and spacer 401. A microlens array 402 is formed on the surface of substrate 403 facing the incident rays 411, 413 and 415. The opposing surface of the substrate 403 (facing the pixelated SLM elements 405, 406 and 407) is antireflection coated 404" to minimize spurious air/substrate interface reflections and refractions.

The lateral dimension of the elements 404a on segments 405, 406 and 407 can be less than the pitch of the SLM (as described with respect to FIGS. 5e and 5f), since the microlens need not form a focus across the entire pixel element 404a (404b; cross section B-B) to achieve a reasonable FOV.

Each microlens of the array 402 is positioned directly above each respective subwavelength element 404a.

The array of equivalent parabolic reflectors 404a, in conjunction with the microlens array 402, forms an array of cat's eye retro reflectors, with each cat's eye retro reflector located at each pixel location of the SLM. Each cat's eye retro reflector of the array is comprised of a microlens (402) of focal length $f_L$, located at a height of $f_L$ (the height of the spacer 401) above each respective (effective) parabolic mirror (404a), the latter of which possesses a radius of curvature equal to $2 \times f_L$. As described with respect to FIG. 4a, the Rayleigh length of the optical system is greater than the displacement δ, ensuring that the retro reflector functions properly over the range of piston strokes of the SLM.

Note that the lateral dimension of the microstructure elements 404a need not span the entire 400 μm width of the deformed region of the pixels (405, 406, 407). As discussed with respect to FIG. 5d, the lateral dimension of the parabolic reflector elements can be reduced by factors of three and still maintain a large device FOV, relative to the prior art. This relaxes the mechanical stress on the subwavelength structure during pixel deformation.

Turning now to FIG. 9a, an exemplary embodiment is shown 900 that utilizes the membrane SLM structure of FIG. 3, with similar aspects of that described with respect to FIG. 8, but now replacing the microlens array 802 with an array of subwavelength elements 505a (505b; cross section C-C). These elements are arranged into an array, which are formed on substrate 504 on the surface facing the pixelated SLM (405, 406 and 407). The opposing surface of substrate 504 (facing the incident rays 411, 413 and 415) is antireflection coated 503" to minimize spurious air/substrate interface reflections and refractions.

As is the case in FIG. 8, this class of SLM employs a continuous membrane 801, which is locally pixelated (405, 406 and 407) by an array of pistons 408 and is driven by the pixelated deformation of a conductive membrane 409 and a ground plane 410 for each pixel. This results in a SLM array with continuous phase control and passive tilt compensation of multi-pixel optical beams. The other callouts and the optical beam functionality are similar to that of FIG. 5a.

Note that this class of SLM is functionally equivalent to that of a conventional deformable mirror, DM. Hence, the details of this embodiment apply to conventional deformable mirrors (i.e., with continuous phase shifting capability, such as piezo-driven DMs). That is, the invention provides a conventional DM with passive retro reflection and tilt compensation over a wide FOV, in a compact structure, while maintain the footprint and form factor to the DM.

A superstructure is formed by substrate 504 with spacer 501 of dimension H, positioned above the SLM, without impeding the motion of the SLM pixel elements 405, 406 and 407.

Note that the lateral dimension of the microstructure need not span the entire 400 μm width of the deformed region of the pixels (405, 406, 407). As discussed with respect to FIG. 5c, the lateral dimension of the parabolic reflector elements 506a (506b; cross section D-D) can be reduced by factors of three and still maintain a large device FOV, relative to the prior art. This relaxes the mechanical stress on the subwavelength structure during pixel deformation.

Note also that the small deformation during device activation does not alter the subwavelength structure appreciably, since the pitch is 400 μm and the stroke is order 3.5 μm; hence, the deformation modifies the microstructure dimensions less than 1%, which is within reasonable tolerances.

As discussed with respect to FIG. 5a, two different pairs of microstructure, subwavelength elements can be realized.

With reference to FIG. 4b, in one case, elements 505a (404b; cross section B-B) emulate microlenses of focal length, $f_L$, equal to H, while elements 506a (404b; cross section B-B) emulate parabolic reflectors, with a radius of curvature equal to $2 \times f_L$.

In this case, the subwavelength structure 506a is formed on a dielectric or semiconductor thin film 503'. The subwavelength structures can be in the form is an array of subwavelength Fresnel elements, Zone plates or high-contrast gratings (e.g., Si structures on a $SiO_2$ substrate). This combination of elements (505a, 506a) forms a cat's eye retro reflector for each pixel in the array, as discussed earlier.

In another case, elements 505a (505b; cross section C-C) and 506a (506b; cross section D-D) emulate metasurfaces, comprised of subwavelength structures (such as arrays of nanoposts, as described with respect to FIG. 5a).

In this case metasurface 505a emulates a focusing element that focuses light with different incident angles onto different points along a gradient metasurface 506a (equivalent to a Fourier transform operation). In addition, metasurface 506a (506b; cross section D-D) imparts a spatially varying photon momentum at twice the incident, in-plane momentum, onto the incident beam upon transmission through the metasurface and reflection from a thin metallization layer. In this case, the subwavelength structure 904a is formed on a gold thin film 904'. As is the case of FIG. 8, the thin-film metallization layer 904' can be deposited over the entire membrane surface, as deemed necessary during the fabrication process.

The result is that this combination of subwavelength metasurfaces acts as a cat's eye retro-reflector over a large set of incident angles (+/−50°), or FOV, and preserves the polarization of a TE wave.

The underside of metasurface 505a (facing the membrane 801 and pixels 405, 406 and 407), as well as the exposed surface of metasurface 506a, are antireflection coated 503" onto the metasurface, to minimize spurious air/substrate interface reflections and refractions. The opposing surface of substrate 504 (facing the incident rays 411, 413 and 415) is also antireflection coated 503" to minimize spurious air/substrate interface reflections and refractions.

In both cases, the SLM in conjunction with the pair of elements each result in a compact, planar, phase-only, continuous (analog) phase-shifting SLM, integrated with a passive tilt compensation function, over a wide FOV.

The phase shifting characteristic is depicted in FIG. 9a, whereby the relative displacement of the membrane pixels (405, 406 and 407) is given by □, with the optical phase shift given by $\varphi=4\pi\delta/\lambda$.

The retro reflection and tilt compensation property is depicted by the incident and backward reflected rays overlapping (411, 413 and 415), where the arrows are back-to-back, and the equiphase surfaces of the incident and retro directed beams overlap (412, 414 and 416) for each piecewise beam.

Turning now to FIG. 9b, an exemplary embodiment is shown 950 that depicts a continuous, phase-only SLM with integrated retro reflection and tilt control using a SLM, similar to that of FIG. 9a, except now with only a thin metallization coating 901 on the planar segments 405, 406 and 407, as depicted in FIG. 6b.

In this case, the metallization thin film is coated on the continuously (analog) driven planar segment surface 801 that faces the metasurface element 506a. Since the metallization layer 901 is in the near field of the metasurface element 506a, its functionality is unaltered relative to direct contacting of the metallization layer with the given element, over the piston displacement range, □ (recall that $z_R>$□, as described with respect to FIG. 6b). Hence, the combination of the elements 505a, 506a and 901 with the SLM forms a planar cat's eye retro reflector with continuous phase shifting capability, on a pixel-by-pixel basis.

As is the case of FIG. 9a, note that the drawing is not drawn to scale. As an example, the thickness of the substrate, t, can range from 50 μm to 5000 μm, the spacer height, H, can range from 10 μm to 5000 μm, and the piston displacement, δ, can range from 1 μm to 10 μm or more.

Note that the optical phase shift imposed onto an optical beam is a continuous function of the applied voltage. Hence, this class of device emulates an analog optical phase shifter array with passive retro reflection and tilt compensation.

Turning now to FIG. 9c, an exemplary embodiment is shown 970 that depicts a continuous, phase-only SLM with integrated retro reflection and tilt control using a SLM, similar to that of FIG. 9b, except now with only a single overall thin-film coating 902, which is formed across the entire membrane 801.

The other callouts, and beam functionality, including both cases of elements (505a and 506a) are similar to those discussed with respect to FIG. 9b: Namely, in one case, subwavelength microdiffractive pairs of elements (recall FIG. 4b) are employed for elements 505a and 506a (in which case the thin film 902 is a dielectric or semiconductor coating on membrane 801); or, in the other case, subwavelength metasurface pairs of elements (recall 505b and 506b) are employed for elements 505a and 506a (in which case the thin film 902 is a metallic coating on membrane 801).

The present embodiment has the advantage over that described in FIG. 9b in that the present fabrication process does not require a mask that exposes only the pixelated regions of the membrane for the coating. Instead, the thin film (on the order of 100 to 200 nm) is deposited over the entire membrane surface 801, limited by mass loading considerations of the SLM pixels.

In both cases, the SLM in conjunction with the pair of elements each result in a compact, planar, phase-only, continuous (analog) phase-shifting SLM, integrated with a passive tilt compensation function, over a wide FOV.

Note that this structure closely emulated that of a conventional deformable mirror, with a thin film coating across its entire surface and the superstructure, substrate and subwavelength elements, as described herein.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated.

As an example, additional superstructure levels can be added without modifying the mechanical properties of the device, yet provide additional optical robust functionality in the face of multi-spectral operation, dispersion, polarization considerations, etc. The concepts herein can apply to both SLM devices as well as conventional, bulk adaptive optical elements such as deformable mirrors, wherein true wavefront reversal is required.

It is to be appreciated that the invention can be implemented to service a variety of beyond atmospheric compensation and adaptive optical systems. Examples include laser communication systems, compensation for telescope and microscope distortions, compact beam forming networks, spectroscopy, medical applications such as optical coherence tomography and microscopy systems, robust Fabry-Perot cavities, stabilized single-mode and multi-mode lasers for compact operation, long laser concepts, remote sensing applications, LIDAR systems and laser scaling architectures. To this end, the teachings of this invention can apply to arrays of devices as well as to single-pixel SLM devices.

Similarly, when the distortion path that imposed the wave front distortions to be compensated is referred to as a dynamic atmosphere, it is to be understood that the teachings can also be applied, without loss of generality, to a correct for propagation-path distortions such as those experienced by imperfect optical elements, and static and/or dynamic distortions due to propagation through, or scattered from, ocular systems, skin tissue, clouds, turbid liquids, industrial environments, beam wander, platform motion, and so on. The system is amenable to closed-loop and open loop optical compensation systems using, as example Shack-Hartmann and pyramid wave-front sensors.

It is also understood that the teachings herein can apply to guided-wave implementations of the present invention, given the state-of-the-art in optical fiber devices including, but not limited to, modulators, Faraday rotators and isolators, polarizers, sensors, fiber couplers and splitters, photonic crystal fibers, holey fibers, diode-pumped fiber lasers, amplifiers, Raman fiber amplifiers and MEMS devices. Fiber realizations can also be employed in place of bulk optical elements.

Furthermore, it is also to be understood that the teachings described herein can also apply to systems that operate in other regions of the electro-magnetic spectrum, from mm waves to the ultraviolet and beyond. As an example, precision compensated imaging over propagation-path distortions in the THz regime can be realized by employing appropriate THz detectors, sources, and beam forming components (THz sensors, imagers, diffraction gratings, photonic crystals, modulators, etc.) analogous to those in the optical embodiments. In addition, it is to be appreciated that the extension of the techniques taught herein can also apply to acoustic and ultrasonic beam forming systems through acoustic-based distortion paths.

The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation.

The scope of the invention is to be defined by the following claims.

What is claimed is:

1. A true wavefront reversal apparatus comprising:
   an array of paired, pixelated optical elements, with each said paired, pixelated optical element comprised of a pixelated reflective optical element and a pixelated transmissive optical element, with each said pixelated reflective optical element aligned with a corresponding said pixelated transmissive optical element, with each said paired, pixelated optical element providing a controllable optical phase shifting operation and a simultaneous retro reflective operation, upon a resolvable component of an incident optical beam, resulting in a true wavefront reversed replica of said incident optical beam;
   a micromechanical device for independently phase shifting each said pixelated, reflective optical element within an array of said pixelated, reflective optical elements, with each said pixelated, reflective optical element imparting a controllable, continuous optical phase shift, of many optical waves, upon each said respective, resolvable component of said incident optical beam;
   a substrate comprised of said array of said pixelated transmissive optical elements, formed on a surface of said substrate, which is displaced from, and facing, said micromechanical device, with each said pixelated transmissive optical element on the substrate aligned directly above each said, respective, corresponding pixelated reflective optical element within the array of independent, pixelated, reflective optical elements;
   a superstructure, comprised of said substrate and a spacer, with the spacer positioned between said micromechanical device surface and said substrate surface, the spacer of which possessing a thickness, in the range of several microns to thousands of microns, so that the controllable, continuous phase shifting capability of the micromechanical device is not impeded or compromised by the substrate; and
   an array of paired optical elements, the first element of each pair comprised of said, respective, pixelated, transmissive optical element and the second element of each pair comprised of a corresponding, said respective, aligned, pixelated, reflective phase shifting optical element, whereby each pair within the array of paired optical elements possessing an independent, respective, controllable optical phase shifting operation with a simultaneous retro reflective operation, on a pixel-by-pixel basis, which performs the operation of true wavefront reversal upon said incident optical beam.

2. The apparatus of claim 1 wherein the micromechanical device is a MEMS spatial phase modulator, comprised of an array of spatial phase modulating pixels, whereby each respective spatial phase modulating pixel of said MEMS spatial phase modulator is in the form of a continuously moveable, reflective planar piston element that imparts a controllable, continuous, reflective optical phase shift, of many waves, onto each respective, corresponding, resolvable component of said incident optical beam.

3. The apparatus of claim 1 wherein each said, paired optical element is comprised of a cat's eye retro reflector optical element, wherein each said cat's eye retro reflector optical element is capable of imposing an independent, controllable optical phase shift and a simultaneous retro reflective operation upon said incident optical beam, thereby resulting in a true wavefront reversed replica of said incident optical beam.

4. The apparatus of claim 3 wherein the cat's eye retro reflecting array is comprised of a set of at least one array of subwavelength optical transmissive elements formed on at least one surface of said substrate.

5. The apparatus of claim 3 wherein the cat's eye retro reflector optical array is comprised of a set of microlens elements, formed on a surface of said substrate so that each said respective microlens element is aligned directly above each said corresponding, respective, reflective pixel of said MEMS spatial phase modulator, at a distance equal to a focal length of said microlens element.

6. The apparatus of claim 5 wherein said array of microlenses is positioned directly above the said micromechanical device, so that each said respective microlens is positioned directly above each said respective pixel of said micromechanical device.

7. The apparatus of claim 6 wherein the said microlens array is positioned above the said micromechanical device pixel element array at a distance equal to the focal length of said microlens.

8. The apparatus of claim 7 wherein the thickness of said substrate is less than the focal length of said microlens.

9. The apparatus of claim 5 wherein each cat's eye retro reflector optical element is further comprised of a planar, subwavelength micro diffractive Zone Plate structure formed on each continuously moveable planar piston element of said MEMS spatial phase modulator to emulate a parabolic reflecting element with a radius of curvature equal to two times said focal length of said microlens element, forming a retro reflector element with a simultaneous, controllable phase shift capability, thereby resulting in a true wavefront reversal replica, on a pixel by pixel basis, upon each respective resolvable component of said incident optical beam.

10. The apparatus of claim 4 wherein cat's eye retro reflecting array is further comprised of a set of first subwavelength metasurface elements, each element of which is formed on a first surface of said substrate so that each element is aligned directly above each said corresponding, respective, reflective pixel of said MEMS spatial phase modulator, wherein each said respective first subwavelength metasurface element focuses light with different incident angles onto different points along the surface of each said corresponding, respective, reflective pixel of said MEMS spatial phase modulator, emulating a Fourier transform operation.

11. The apparatus of claim 10 wherein a superstructure is comprised of said substrate and a spacer of a thickness so that the height of said substrate directly above the said MEMS spatial phase modulator is equal to the focal length of the said first subwavelength metasurface array element, thereby performing a spatial Fourier transform of said incident optical beam at the surface of said MEMS spatial phase modulator.

12. The apparatus of claim 11 wherein the cat's eye retro reflector further comprises a second set of subwavelength metasurface elements, with each second subwavelength metasurface element comprised of a gradient structure which, in turn, is formed on a thin film gold coating, the combined multilayer structure of which is formed on each said respective continuously moveable planar piston element of said MEMS spatial phase modulator, so that each said second subwavelength metasurface and gold coating multilayer combined structure, further combine with the first subwavelength metasurface element to impart a photon momentum equal to twice the in-plane photon momentum upon each said, corresponding respective, resolvable component of the incident optical beam, forming cat's eye retro reflector element with a simultaneous, controllable phase shift capability, thereby resulting in a true wavefront reversed replica, on a pixel by pixel basis, of each said respective resolvable component of said incident optical beam.

13. The apparatus of claim 4 wherein said cat's eye retro reflecting array is comprised of a first subwavelength metasurface element array formed on a first surface of a substrate mounted on a superstructure directly above said MEMS spatial phase modulator, so that said array faces the said incident optical beam, and so that each said respective first metasurface element that comprises the array is positioned directly above each said respective pixel of said MEMS spatial phase modulator.

14. The apparatus of claim 13 wherein the thickness of the said substrate is equal to the focal length of said first subwavelength metasurface element.

15. The apparatus of claim 14 wherein said cat's eye retro reflector array further comprises a second subwavelength metasurface array of elements formed on the second surface of the substrate which faces the surface of said MEMS spatial phase modulator, with each respective said second metasurface array element positioned directly above each said respective pixel of said MEMS spatial phase modulator.

16. The apparatus of claim 15 whereby the cat's eye retro reflector further comprises a thin film gold element, which is formed on each said respective continuously moveable planar piston element of said MEMS spatial phase modulator, whereby each said first metasurface element and said corresponding second metasurface element on opposing surfaces of the substrate, in combination with each said corresponding thin film gold element of the MEMS spatial phase modulator, forms a retro reflector element with a simultaneous, controllable phase shift capability, thereby resulting in a true wavefront reversed replica, on a pixel by pixel basis, of each said respective resolvable component of said incident optical beam.

17. A true wavefront reversal apparatus, with the capability to temporally phase modulate all resolvable elements, simultaneously, of an incident optical beam comprising;
 a cat's eye retro-reflecting array comprised of a set of microlens elements formed on a substrate and a set of reflective optical elements, comprised of an array of MEMS spatial phase modulator pixels, with each said microlens element aligned directly above each corresponding said reflective optical element, the substrate of which is positioned at height above the said MEMS spatial phase modulator equal to the focal length of the said microlens element, performing the simultaneous operations of retro reflection and spatial phase shift capability upon each resolvable component of said incident optical beam, on a pixel by pixel basis, thereby resulting in a true wavefront reversed replica of said incident optical beam; and
 a true wavefront reversed optical beam, encoded with a temporal phase modulation signal imposed upon all said resolvable elements by temporally phase modulating all pixels simultaneously that comprise the said MEMS spatial phase modulator array with a time-dependent signal applied simultaneously to the entire set of said reflective spatial phase optical elements.

* * * * *